US007009742B2

(12) United States Patent
Brotherton-Ratcliffe et al.

(10) Patent No.: US 7,009,742 B2
(45) Date of Patent: Mar. 7, 2006

(54) HOLOGRAPHIC PRINTER

(75) Inventors: David Brotherton-Ratcliffe, Pease Pottage (GB); Florian Michel Robert Vergnes, Pease Pottage (GB); Alexey Rodin, Vilnius (LT); Mikhail Grichine, Vilnius (LT)

(73) Assignee: XYZ Imaging, Inc., Montreal (CA)

( * ) Notice: Subject to any disclaimer, the term of this patent is extended or adjusted under 35 U.S.C. 154(b) by 0 days.

(21) Appl. No.: 11/056,589

(22) Filed: Feb. 11, 2005

(65) Prior Publication Data

US 2005/0200925 A1 Sep. 15, 2005

Related U.S. Application Data

(63) Continuation of application No. 10/149,211, filed as application No. PCT/GB00/04699 on Dec. 8, 2000.

(30) Foreign Application Priority Data

Dec. 10, 1999 (LT) ....................... 99-143

(51) Int. Cl.
*G03H 1/26* (2006.01)
(52) U.S. Cl. ......................... 359/22; 359/35
(58) Field of Classification Search .................. 359/9,
359/22, 23, 24, 25, 35
See application file for complete search history.

(56) References Cited

U.S. PATENT DOCUMENTS

| | | | |
|---|---|---|---|
| 3,832,027 A | 8/1974 | King | 350/3.5 |
| 3,843,225 A | 10/1974 | Kock et al. | 350/3.5 |
| 4,037,919 A | 7/1977 | Takeda et al. | 350/3.5 |
| 4,206,965 A | 6/1980 | McGrew | 350/3.76 |
| 4,421,380 A | 12/1983 | McGrew | 350/3.78 |
| 4,498,740 A | 2/1985 | Caulfield | 350/3.66 |
| 4,701,006 A | 10/1987 | Perlmutter | 350/3.66 |
| 4,719,160 A | 1/1988 | Gerhart et al. | 430/2 |
| 4,778,262 A | 10/1988 | Haines | 350/3.66 |
| 4,832,445 A | 5/1989 | Haines et al. | 350/162.2 |
| 4,834,476 A | 5/1989 | Benton | 350/3.76 |
| 4,964,684 A | 10/1990 | Iovine | 350/3.76 |

(Continued)

FOREIGN PATENT DOCUMENTS

EP 06976312 2/1996

(Continued)

OTHER PUBLICATIONS

Masahiro Yamaguchi et al.; *Development of prototype full-parallax holoprinter*, XP-000979992, SPIE vol. 2406, 1995, pp. 50-56.

*Primary Examiner*—Mark A. Robinson
*Assistant Examiner*—Alessandro Amari
(74) *Attorney, Agent, or Firm*—Madan, Mossman & Sriram, P.C.

(57) ABSTRACT

The present invention provides a single method and apparatus for producing many of the most common types of hologram from digital data is disclosed. The data are generated entirely by a computer as a 3-D (animated) model or from multiple 2-D camera images taken of a real 3-D (moving) object or scene from a plurality of different camera positions. The data are digitally processed and displayed on a small high resolution spatial light modulator (SLM). A compact low energy pulsed laser, is used to record composite holograms. The present invention permits the creation of restricted or full parallax master transmission or reflection type composite holograms, known as H1 holograms, that can be copied using traditional methods. Alternatively the same invention and apparatus permits the direct writing of hologram without the need to pass through the intermediate stage of the H1 transmission hologram.

14 Claims, 17 Drawing Sheets

U.S. PATENT DOCUMENTS

| | | | |
|---|---|---|---|
| 4,969,700 A | 11/1990 | Haines | 350/3.66 |
| 5,046,792 A | 9/1991 | Zabka | 359/26 |
| 5,138,471 A | 8/1992 | McGrew | 359/21 |
| 5,194,971 A | 3/1993 | Haines | 359/9 |
| 5,237,433 A | 8/1993 | Haines et al. | 359/9 |
| 5,475,511 A | 12/1995 | Haines et al. | 359/9 |
| 5,519,517 A | 5/1996 | Redfield et al. | 359/22 |
| 5,734,485 A | 3/1998 | Buchkremer et al. | 359/25 |
| 5,793,503 A | 8/1998 | Haines et al. | 359/9 |
| 5,796,500 A | 8/1998 | Hart | 359/24 |
| 5,949,559 A | 9/1999 | Kihara et al. | 359/23 |
| 5,973,806 A | 10/1999 | Campbell et al. | 359/15 |
| 5,973,807 A | 10/1999 | Buchkremer et al. | 359/25 |
| 6,081,381 A | 6/2000 | Shalapenok et al. | 359/619 |
| 6,088,140 A | 7/2000 | Klug et al. | 359/23 |
| 6,266,167 B1 | 7/2001 | Klug et al. | 359/12 |
| 6,330,088 B1 | 12/2001 | Klug et al. | 359/235 |

FOREIGN PATENT DOCUMENTS

| | | |
|---|---|---|
| EP | 0929018 A | 7/1999 |
| WO | WO00/29909 | 5/2000 |

| Component Nr. | f' | $s_F$ | $s'_{F'}$ | $0\varnothing_A$ | $0\varnothing_B$ | $\Sigma d$ |
|---|---|---|---|---|---|---|
| 1 | 26.12 | -24.61 | 26.38 | 7.2 | 9.9 | 2.30 |
| 2 | -15.00 | 14.82 | -17.41 | 10.8 | 16.5 | 3.97 |
| 3 | 60.56 | -51.10 | 67.46 | 23.0 | 28.5 | 6.60 |
| 4 | 43.91 | -37.81 | 43.97 | 38.5 | 41.6 | 11.00 |
| 5 | -153.55 | 160.60 | -149.17 | 44.0 | 42.5 | 4.00 |
| 6 | 89.92 | -88.53 | 84.24 | 59.6 | 59.6 | 11.35 |
| 1..6 | 34.55 | -3.04 | 19.46 | 7.2 | 59.6 | 67.60 |

Optical parameters 1. focal length (EFL) f' = 34.55±0.1
   BFL $s'_{F'}$ = 19.46
   FFL $s'_F$ = -3.04
2. size of LCD  26.4 X 19.8
3. object angle of view 2w = 85°
4. image aperture NA = 0.033

| Mag. | s | s' | $2l_H$ | $2l_V$ |
|---|---|---|---|---|
| -45.0 | 1555 | 20.2 | 2376 | 1576 |
| -31.8 | 1099 | 20.5 | 1680 | 1114 |
| -22.5 | 777 | 21.0 | 1188 | 788 |
| -15.9 | 549 | 21.6 | 840 | 556 |

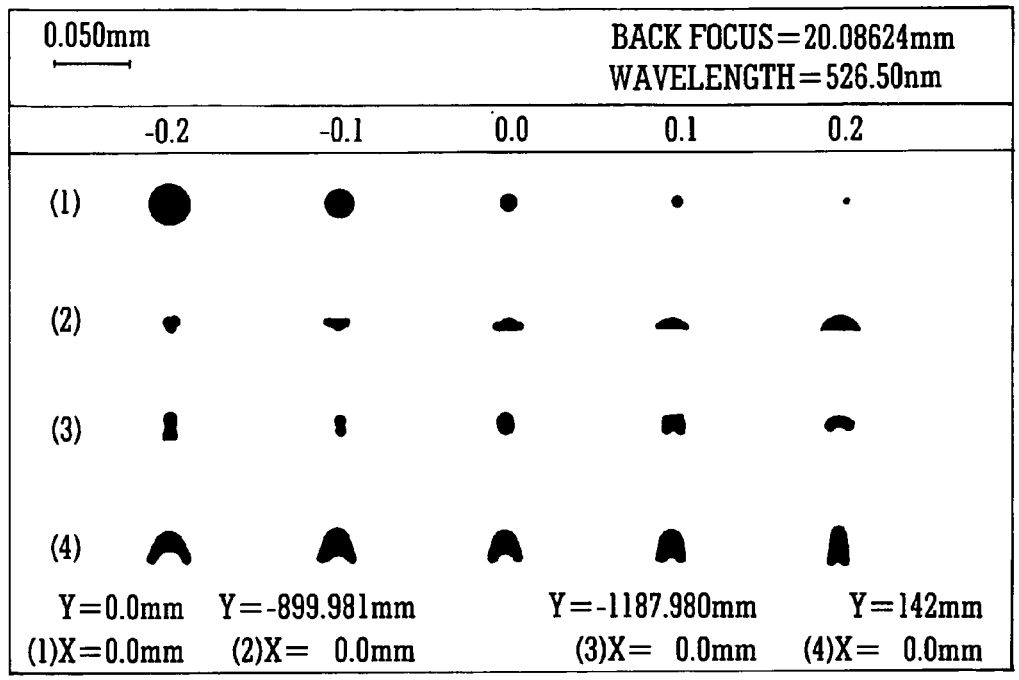
FIG. 13A ZOOM CONFIGURATION 1
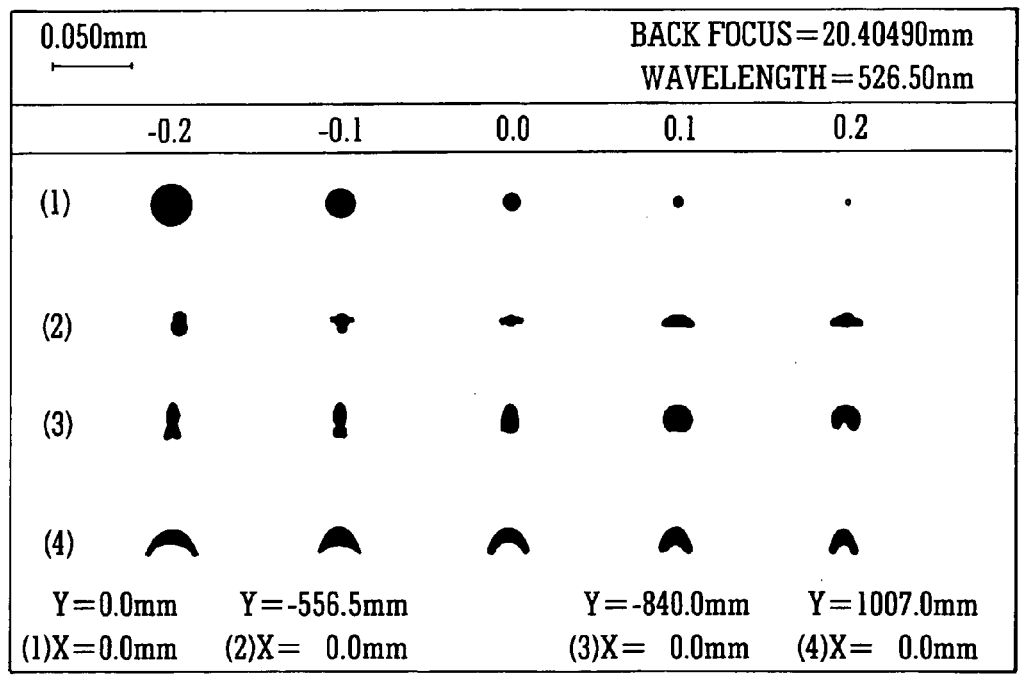
FIG. 13B ZOOM CONFIGURATION 2

MAP OF SMOOTHED DATA ZOOM #3

SMOOTHED 3D DATA ZOOM #3

RAY GENERATION ZOOM #3

RAY DISTRIBUTION AT IMAGE SURFACE ZOOM #3

HOLOGRAPHIC PRINTER

CROSS REFERENCES TO RELATED APPLICATIONS

This application is a continuation of the U.S. Patent Application having the Ser. No. 10/149,211 filed Sep. 30, 2002 which is a 371 of PCT/GB00/04699 filed Dec. 8, 2000.

BACKGROUND OF THE INVENTION

The present invention relates to holographic printers. According to a preferred embodiment a method and apparatus for recording and printing holographic stereograms from digital data is disclosed.

For over 50 years holograms have been produced by the general technique of illuminating an object with coherent light and arranging that the scattered light falls onto a photosensitive recording material that is also illuminated by a mutually coherent reference beam (see for instance E. N. Leith et al., "Reconstructed Wavefronts and Communication Theory", Journal of the Optical Society of America 53, 1377–81 1963). However, with such a technique one requires a physical object in order to make an holographic representation of this object and usually the size of the holographic image corresponds in a 1:1 fashion with the size of the object holographed. For many practical applications this technique is hence unsuitable.

An alternative technique of generating and then directly writing the fundamental interference pattern that characterizes an hologram has been discussed and investigated (see for instance U.S. Pat. No. 4,701,006). However, even with todays computer resources, calculation of the interference pattern by Fourier transforms remains a daunting computational task for larger holograns. In addition it is still highly difficult and costly to write such patterns once calculated, the preferred technique being by electron beam.

Another technique for the generation of holograms that does not require an actual object was proposed by King et al (Applied Optics, 1970). In this paper it was shown that holograms can be composed by optically multiplexing information taken from a plurality of 2-D camera views. The importance of this idea is that the machine that prints the final holograms can be separate from the actual object and that the holographic image does not have to correspond in size to the original object. Further, it has been shown that an object is not required at all if the 2-D views are generated from raw computer data (see for example U.S. Pat. No. 3,843,225).

In a common embodiment of the above principle it is known to record sequential views of an object by a camera mounted on a linear or circular track. Each of the views is then used in an optical system that multiplexes the data together to form an intermediate (or H1) hologram such as described in U.S. Pat. No. 3,832,027. Such a hologram can then be converted or transferred to form a second hologram which is now white-light viewable and is known as the H2 hologram. In order to effect this the H1 hologram is illuminated by laser light in a time-reversed geometry and the real image so produced is used as the object for the H2 hologram. Upon illumination of this H2 hologram by a time-reversed reference beam a white-light viewable virtual image is reconstructed. An efficient and practical commercial machine for converting H1 holograms to H2 holograms is known (see M. V. Grichine, D. B. Ratcliffe, G. R. Skokov, "An Integrated Pulsed-Holography System for Mastering and Transferring onto AGFA or VR-P Emulsions" Proc. SPIE Vol. 3358, p. 203–210, Sixth International Symposium on Display Holography, Tung H. Jeong; Ed.).

Holographic printing techniques which implicitly require the generation of an intermediate, or H1, hologram which is thereafter used to produce a final white-light-viewable hologram are commonly referred to as "2-step" holographic printing processes. Essentially all the major features of known "2-step" holographic printing processes are explained in U.S. Pat. No. 3,832,027. Subsequent developments (e.g. Spierings W. et al., "Development of an Office Holoprinter II", SPIE Vol. 1667 Practical Holography VI 1992) have replaced the photographic film used in U.S. Pat. No. 3,832,027 with an LCD screen.

An alternative scheme to the "2-step" printing process is described in U.S. Pat. No. 4,206,965 whereby the photographic images are directly multiplexed onto the final white-light viewable hologram in the form of many long thin slit holograms located side by side, thereby avoiding the need for creating an intermediate H1 hologram. Holographic printing schemes in which the final white-light-viewable hologram is printed directly without the need to generate an intermediate (H1) hologram are generally referred to as "1-step" or direct-write methods. Subsequent to this, a system was developed as described in U.S. Pat. No. 4,498,740 for the recording of two dimensional composite holograms composed of a two dimensional grid of separate holograms, each such hologram corresponding to a single object point. However, this latter system suffered from the disadvantage that the image should be located very close to the recording material. Additionally, the system was unable to form holograms which faithfully reconstructed the directional properties of light emanating from each image point.

U.S. Pat. No. 4,421,380 describes a system for producing 1-step full-colour transmission holograms from 3 interlaced strip or point composite holograms of the achromatic type by the inclusion of a registered colour-filter mask. U.S. Pat. No. 4,778,262 describes a 1-step method for writing directly a two dimensional matrix of basic holograms from computer data. Reference is also made to U.S. Pat. Nos. 4,969,700 and 5,793,503. U.S. Pat. No. 5,138,471 describes a similar technique whose preferred embodiment used a one dimensional spatial light modulator connected to a computer to directly write (1-step) common types of holograms as a two-dimensional matrix of basic holograms. U.S. Pat. No. 4,834,476 describes yet another similar 1-step technique based on computational or sequential camera data whose use was described for the direct writing of "Alcove" (curved) composite holograms having either a reflection or transmission geometry but which technique could be generalized to more conventional flat holograms.

Perhaps the most pertinent prior-art with regards 1-step direct-write holographic printers is the work of Yamagushi et al. ("Development of a prototype full-parallax holoprinter", Proc. Soc. Photo-Opt Instrum. Eng (SPIE) vol. 2406, Practical Holography IX, pp 50–56 February 1995 and "High Quality recording of a full-parallax holographic stereogram with digital diffuser", Optical Letters vol 19, no 2 pp 135–137 Jan. 20, 1994). This is discussed in more detail below and the known arrangement is described making reference to FIG. 16. A CW HeNe laser 1601 produces a beam which traverses an acousto-optic modulator 1602 before being relayed by mirrors 1603, 1604 and 1605 to the beam splitter 1609. The function of element 1602 is to act a simple shutter. At element 1609 the beam is broken into a reference arm and an object arm. The object beam passes through a 1/wave plate 1608 and a polarizer 1607 for polarization adjustment. It is then redirected by mirror 1606 before passing through telescope lenses 1612 and 1613. The beam is now steered by mirror 1614 to illuminate a twisted-nematic LCD panel 1615 having a resolution of 340×220 pixels with optional attached pseudorandom diffuser 1616 before being converged to a small spot of size 0.3 mm×0.3 mm on a photosensitive film 1620 within a defining aperture 1618 with a plunging mechanism 1619 for clamping said aperture and film together at each exposure.

The reference beam produced by element 1609 traverses the ½ waveplate 1610 and polarizer 1611 before being directed, via mirror 1621, onto the photosensitive substrate 1620 at the location defined by the aperture 1622, said aperture matching aperture 1618 but located on the reference beam side of the film.

The above system thus causes a reference beam and an object beam to co-illuminate a photosensitive film from opposite sides of said film in a small zone known as a holographic pixel or holopixel. The size of the holographic pixel thus made is effectively determined by the apertures 1618 and 1622. The object beam is focused down to said holographic pixel by the lens 1617 whose Fourier plane is arranged to lie on the photosensitive material 1620. By moving the photosensitive film 1620 in a two dimensional stepped manor and at each step changing the image in the LCD 1615, waiting for the system vibration to die out and then exposing a subsequent holopixel, a plurality of such holopixels are recorded onto the photosensitive film 1620. By computationally calculating all required LCD images a monochromatic white-light-reflection hologram is thus generated of a 3-D full parallax scene or object.

The above arrangement suffers from many disadvantages. Foremost the use of a CW laser severely limits the write time of each holographic pixel. In addition air currents, temperature changes and environmental sound will generally disturb the proper operation of such a printer. Hence, the arrangement suffers from a low printing speed, and it is not practically possible to implement such a device outside of a strictly controlled laboratory environment. It is to be noted, for example, that it is disclosed to take around 36 hours in order to write even a small hologram of 320×224 liolopixels.

Another disadvantage of the above system is that it can only produce holographic pixels of one size. This is because both contact apertures 1618, 1622 and the fixed pseudorandom diffuser 1616 of pitch equal to that of the LCD are used to define the size of said holographic pixels. Both of these subsystems fundamentally constrain the holographic pixel size. Such a system is not therefore able to continuously change the holographic pixel size and hence different formats of holograms which require fundamentally different pixel sizes can not be readily produced.

The use of contact apertures 1618, 1622 in the system, apart from being inflexible, is also highly problematic since the emulsion surface of the photosensitive material is very sensitive.

Another disadvantage of this arrangement is that it is only designed to produce monochromatic reflection type holograms. Therefore transmission type holograms such as rainbows and achromats are precluded. The system is also unable to produce master H1 type holograms, and is similarly incapable of producing any form of multiple colour hologram.

Another disadvantage of the above system is that the wide-angle objective 1617 employed is designed to only minimize spherical aberration, is simplistic in design and only allows a restricted set of holographic formats to be produced.

Another disadvantage of the system is that the reference beam angle is fixed and cannot be controlled as may be required, for instance, to arrange for different hologram replay conditions. This is particularly problematic at large format.

As is readily apparent, the above described holographic printer suffers from numerous problems which render it impractical to use commercially.

In many cases the 2-step method of generating an intermediate H1 hologram from computer data and then copying or image-plane transferring this hologram to form a white-light viewable hologram (H2) is to be preferred over the above mentioned methods of directly writing the final hologram. This is due to a number of reasons. Firstly, it is frequently preferred to generate restricted parallax holograms, having only horizontal parallax. With the 2-step technique which produces an intermediate H1 hologram, such an H1 hologram may essentially be composed of one or more one-dimensional strips of overlapping holographic pixels. The classical optical transfer technique then takes care of the much harder computational step of calculating the distribution of light over the entire two-dimensional surface of the final (H2) hologram. If such a final hologram is written directly as in a 1-step printing scheme then this computation must be done by computer. In addition, for large holograms, the time required to write a two dimensional array of holographic pixels is usually proportional to the square of the time required to write the H1 master hologram and as such can become prohibitively long for some applications. Furthermore, a frequent complaint of directly written 1-step composite holograms is that the holograms appear "pixelated" whereas the 2-step technique of using an H1 master hologram is less prone to this problem.

Notwithstanding the above, there are many situations where it is advantageous to directly write the final hologram by a 1-step direct-write method. For example, directly written holograms are more easily tiled together to form ultra-large displays. Also in many applications quick previews of the final hologram are required and it is not generally convenient to produce an H1 hologram and then to put this hologram into another machine in order to generate the final H2 hologram. Additionally, the 1-step technique of directly writing holograms allows the creation of hybrid holograms having very non-standard viewing windows, something which is likely to be demanded by the printing industry in the context of holographic bill-board displays. Further advantages of the 1-step system are that materials such as photopolymers (see for example European patent EP0697631B1) may be used which require only dry processing, whereas the more sensitive Silver Halide materials requiring wet processing must be employed for classically copied H2 holograms due to simple energy considerations.

Known 1-step and 2-step holographic printing processes employ CW lasers and thus, as a result, conventional holographic printing technology has been fundamentally slow and prone to vibrational disturbance.

In order to examine the salient features of the known 2-step holographic printers, the holoprinter described by U.S. Pat. No. 3,832,027 is reproduced in FIG. 15 and will be discussed below. A CW laser 41 emitting a monochromatic beam 71 is steered by prism 62 towards a beam splitter 43. Here the beam is divided into two parts. One part is commonly known as the reference beam and the other part as the object beam. The reference beam then further travels to a spatial filter and collimator (46 to 48) thus producing a collimated beam 72 which is steered by mirror 64 to an overhead tilted mirror 65 which finally directs said beam onto a photosensitive substrate 60 from above and at a suitable angle. A thin vertical aperture 58 covers the photosensitive substrate 60 in order to mask all but a thin vertical stripe 59 in said substrate.

The object beam emanating from optic 43 is reflected by prism 63 to a projection system 51 consisting of illumination lens 52, a photographic film transparency advance system 53 with film image 33 and a projection lens 54. The purpose of this projection system 51 is to project a magnified and focused image of the image, present on the film frame 33, onto the large diffusion screen 56 in coherent light. The light from this magnified image is then diffused by the diffuser in a wide variety of directions with some of said light falling onto the area of the photosensitive substrate 59 not covered by the aperture 58.

The system works by moving, in steps, the aperture across the photosensitive material surface in a direction orthogonal to the slit direction (ie vertically in the diagram and horizontally in reality) and by a finite amount, making a laser exposure at each such step. The film advance system is operated each time the aperture is moved such that the film image is changed at each exposure. By arranging that a set of appropriate perspective views of a certain 3-D scene or object are stored on the film roll, a holographic stereogram may thus be encoded on the photosensitive substrate 60.

There are many disadvantages of this system. Foremost, the use of a CW laser means that the entire system must be installed on a vibration isolation platform which must usually be pneumatically suspended. In addition air currents, temperature changes and environmental sound will generally disturb the proper operation of such a printer. Hence the system suffers from a low printing speed and it is impractical to use such a device outside of a strictly controlled laboratory environment.

Another disadvantage of this holoprinter is that a diffusion screen is utilized onto which 2-D perspective view images are projected. When the H1 hologram produced by this method is transferred to form an H2 hologram that is white-light viewable (see e.g. FIG. 6 of U.S. Pat. No. 3,832,027), the size of such final white-light viewable hologram (H2) must be less than or equal to the size of the diffusion screen 56. Thus, for example, if it is desired to generate a 1 m×1 m white light viewable hologram then a diffusion screen of at least 1 m×1 m size must be used. Since the distance D shown in FIG. 15 must correspond to both the final optimum viewing distance of the white-light-viewable hologram and the distance D, shown in FIG. 6 of U.S. Pat. No. 3,832,027, such distance D must usually be rather greater than the hologram size. One can thus see that the intensity of object light finally falling through the slit 59 of the aperture 58 onto the photosensitive material 60 of FIG. 15 is many orders of magnitude less than the total light illuminating the diffusion screen. In the case that it is desired to generate a white-light-viewable hologram (H2) of size 1 m×1 m by the process described in FIG. 6 of U.S. Pat. No. 3,832,027, a value of D shown in FIG. 15 of approximately 1 m may sensibly be adopted. Taking the average sensitivity of standard Silver Halide holographic film to be 50 $\mu J/cm^2$ and making various realistic system approximations it can be shown that a minimum laser energy of 1 Joule is required. Therefore, in order to write such holograms, either a large CW laser would be required or very long exposures must be used. However a powerful laser is undesirable due to the problems of thermal heating of the various optical components, particularly the film 33, which must remain interferometrically static during each and every exposure. Long exposure times are undesirable because of problems due to vibration.

Another disadvantage of the above system is that a diffusion screen, aside from being energetically inefficient, inevitably deteriorates the image quality.

Another disadvantage of the above system is that a point source is used to illuminate the film transparency and thus the final image fidelity will be severely limited.

Another disadvantage of the above system is that a large moving aperture must move in quasi-contact with the photosensitive emulsion surface. This is usually very problematic as the emulsion of the photosensitive material 60 is usually highly fragile and yet if the aperture 58 is held at more than a very small distance from said emulsion surface then the quality of the generated hologram will rapidly fall.

A yet further disadvantage of the above arrangement is that the moving aperture will inevitably leave areas of the hologram which are either doubly exposed or unexposed, thus diminishing the quality. This is particularly true when the slit size 59 is much smaller than the hologram size.

Another disadvantage of the above arrangement is that it is only capable of making H1 type holograms and cannot directly write 1-step white-light-viewable holograms where the 3-D object bisects the hologram plane.

A further disadvantage of the above arrangement is that it is only capable of reasonably writing single parallax holograms as generalization of the technique to full parallax would render the technique hopelessly cumbersome given the above cited problems. A commercial holographic printing device must be expected to be relatively compact, operate in a normal commercial environment which is prone to vibrations, produce a variety of hologram formats and possess reasonable print times.

Accordingly it is desired to provide an improved holographic printer.

SUMMARY OF THE INVENTION

According to a first aspect of the present invention there is provided a holographic printer for writing H1 master holograms for subsequent conversion to white-light viewable holograms, comprising:
- a laser source arranged to produce a laser beam at a first wavelength;
- a lens system for writing a master hologram comprising a plurality of holographic pixels on to a photosensitive medium;
- positioning means for positioning the photosensitive medium relative to said lens system;
- wherein:
- the laser source comprises a pulsed laser source;
- the positioning means is arranged and adapted to position the photosensitive medium at a position downstream of the Fourier plane and upstream of the image plane of the lens system; and
- the holographic printer further comprises automatic spatial coherence varying means for automatically varying the spatial coherence of the laser beam so as to control the diameter of the object laser beam at the Fourier plane. Preferably, the automatic spatial coherence varying means can control in a continuously variable manner the diameter of the object laser beam at the Fourier plane.

The step of using a pulsed laser as the laser source of a holographic printer is particularly advantageous since it enables the printer to operate without sensitivity to external or internal vibration or slight temperature fluctuations. In addition the speed of printing is fundamentally increased as there is no need to wait for vibration to dissipate before making an exposure. Thus the write speed is essentially determined by the refresh rate of the SLM used. Accordingly the preferred embodiment can work several orders of magnitude faster than conventional printers which use a CW laser and with a reliability of operation fundamentally higher.

The positioning of the photosensitive material, in use, at a position downstream of the Fourier plane and upstream of the image plane of the lens system should be contrasted to the above mentioned known system where a lens system is used to project an image onto a diffusion screen which then subsequently scatters light onto the photosensitive material. In the preferred embodiment the photosensitive material is placed, in use, nearer the Fourier plane than the Image plane. As a result of this, an energy economy of at least several orders of magnitude is provided which enables a much smaller laser source to be used than that utilised in conventional holographic printers. Secondly, the preferred embodiment allows a compact machine to be constructed in contrast to conventional devices where a larger hologram size requires a proportionally larger printer. Thirdly, by directly exposing the photosensitive material a better image quality is attained. Fourthly, by directly exposing the photosensitive material the awkward apertures of the prior art are rendered redundant.

The fact that the holographic printer further comprises an automatic spatial coherence varying means for automatically varying the spatial coherence of the laser beam allows the diameter of the object laser beam at the Fourier plane to be controlled. Generally the larger the diameter of the object laser beam at the Fourier plane the greater the fidelity of the final image. However, if the beam diameter at the Fourier plane becomes too large, hologram image depth will be lost. Since the optimum size of the diameter of the object beam at the Fourier plane is a function of the type of hologram being written, the format of said hologram, the image contained therein and various other printer parameters, it is highly desirable to be able to continuously change this diameter.

Preferably, the automatic spatial coherence varying means comprises an adjustable telescope and a microlens array, wherein the adjustable telescope is arranged to create an approximately collimated variable diameter laser beam that illuminates the microlens array. The telescope is arranged to illuminate a variably controllable area of the microlens array and the lenslet pitch of the lens array may be chosen such that individual lenses emit radiation that substantially does not superpose to create speckle. Thus it is possible to effectively and simply control the diameter of the object beam at the Fourier plane and also to create a high fidelity image of the LCD screen effectively illuminated by the ensemble of radiative lenslet sources and substantially free of speckle.

Preferably, the holographic printer further comprises a translatable spatial light modulator arranged downstream of the automatic spatial coherence varying means and upstream of the lens system. Currently available spatial light modulators have finite resolution. In order to attain a higher final hologram resolution than is otherwise possible with a static SLM, the spatial light modulator may be moved within the input data plane of the objective. Such a system increases the effective holographic resolution capabilities of the holographic printer.

Preferably, the holographic printer further comprises means for modifying images sent to the spatial light modulator so as to at least partially correct for inherent optical distortions of the printer. Software correction of the digital computer images prior to their display on the spatial light modulator is a highly desirable preferred feature of the present invention. This is because, in order to design suitable wide angle objectives for a holographic printer, better performance in eliminating aberrations characterised by the first four Seidel coefficients may be realised if some optical distortion ($5^{th}$ coefficient) is accepted. Thus effectively a better objective limiting resolution and a better objective field of view may be attained in the case that the wide angle objective possesses some barrel or pincushion distortion. Since, for many types of hologram, different colour channels must be written which must exactly register, the use of software image correction is particularly advantageous.

Preferably, said lens system has an effective field of view greater than 70 degrees, preferably greater than 75 degrees, further preferably greater than 80 degrees, further preferably at best 85 degrees. The lens system's field of view determines the maximum field of view possible for a final image-planed white-light hologram produced from the H1 masters of the preferred embodiment. It also determines the format of holograms that a holographic printer can produce. Thus a lens system of field of view under 70 degrees would severely limit the application of the device.

Preferably, the Fourier plane of the lens system is located downstream of the lens system, further preferably at least 1 mm, 1.5 mm, 2 mm or 2.5 mm downstream of the lens system. It is a difficult task to design a wide angle objective that has its minimum waist (Fourier Plane) outside and downstream of the objective. It is an even more difficult task to allow sufficient space between the final lens of the objective and this plane such that a reference beam may be brought in (from the objective side) at Brewster's angle to co-illuminate a photosensitive film near or at the Fourier plane (see e.g. FIG. 12). If the distance from the Fourier plane to the objective is much less than about 2 mm then it becomes virtually impossible to utilise currently available spatial light modulators.

Preferably, the laser source is arranged to additionally produce laser beams at second and third wavelengths, the first, second and third wavelengths each differing from one another by at least 30 nm. By arranging for the laser source to be a multiple colour multiple colour master holograms may be constructed which may be used to produce multiple colour image planed holograms.

Preferably, the holographic printer further comprises a second and a third laser source for producing laser beams at second and third wavelengths, the first, second and third wavelengths each differing from one another by at least 30 nm. An alternative arrangement to a multiple colour laser is several lasers each producing a different colour emission.

Preferably, the holographic printer further comprises a first lens system for use at the first wavelength, a second lens system for use at the second wavelength, and a third lens system for use at the third wavelength, wherein the first, second and third lens systems are arranged so that a desired lens system may be automatically selected. As mentioned above the design of the objective is critical and usually a far better objective may be designed if it is to function only at one wavelength. Hence when using multiple colour operation different lens systems are preferably used which are optimised to one particular wavlength.

According to a second aspect of the present invention, there is provided a holographic printer for writing master holograms for subsequent conversion to white-light viewable holograms, comprising:
 a laser source arranged to produce a laser beam at a first wavelength;
 a lens system for writing a master hologram comprising a plurality of holographic pixels on to a photosensitive medium;
 positioning means for positioning the photosensitive medium relative to the lens system;
 wherein:
 the laser source comprises a pulsed laser source; and
 the positioning means is arranged and adapted to position the photosensitive medium at a position downstream of the Fourier plane and upstream of the image plane of the lens system.

Preferably, the holographic printer further comprises spatial coherence varying means for varying the spatial coherence of the laser beam, the spatial coherence varying means comprising a plurality of discrete diffractive elements and wherein the number of discrete diffractive elements illuminated by the laser beam may be varied and/or controlled.

Preferably, the holographic printer further comprises a plurality of lenslets and means for varying the number of lenslets illuminated by the laser beam.

Preferably, the holographic printer further comprises means for varying the spatial coherence of the beam, further preferably in an automatic manner, without substantially introducing speckle noise.

Preferably, the holographic printer further comprises means for varying the spatial coherence of the laser beam in a continuously variable non-discrete manner.

Preferably, the holographic printer further comprises spatial coherence varying means comprising a plurality of components, wherein the relationship between the components may be varied in order to change the spatial coherence of the laser beam. According to a particularly preferred embodiment, the relationship which may be varied is the relative distance between two lenses.

According to a third aspect of the present invention there is provided a method of writing master holograms for subsequent conversion to white-light viewable holograms, comprising:
 providing a laser source arranged to produce a laser beam at a first wavelength;
 providing a lens system for writing a master hologram comprising a plurality of holographic pixels on to a photosensitive medium;
 positioning a photosensitive medium relative to the lens system;
 wherein:
 the laser source comprises a pulsed laser source;
 the photosensitive medium is positioned downstream of the Fourier plane and upstream of the image plane of the lens system; and
 the method further comprises the step of:
 automatically varying the spatial coherence of the laser beam so as to control in a continuously variable fashion the diameter of the object laser beam at the Fourier plane.

According to a preferred embodiment there is provided a single method and apparatus capable of both (i) writing directly a final white-light viewable composite holographic stereogram and (ii) writing an H1 master hologram that can be used to then generate a white-light viewable holographic stereogram by classical image planing, the stereograms being either of restricted parallax or of full parallax and of single colour or of multiple colour.

The preferred embodiment solves the problem of the sensitivity to ambient and machine-caused vibration in a commercial holographic printing machine by the use of a pulsed laser having appropriate temporal and spatial beam characteristics, such that the writing time of the hologram is limited only by the refresh rate of the spatial light modulator employed.

The preferred embodiment employs the combination of a spatial light modulator, an aberration minimized wide-angle objective having a minimum beam waist outside the objective and uses a method of controlling the spatial coherence of the laser beam passing through said optical elements without the induction of significant speckle noise, in order to record an H1 master hologram without use of a diffusion screen onto which an image is conventionally projected.

The preferred embodiment uses the combination of a spatial light modulator, an aberration minimized wide-angle objective having a minimum beam waist outside the objective and uses a method of controlling the spatial coherence of the laser beam passing through said optical elements without the induction of significant speckle noise, in order to record a general composite hologram, which may or may not be white-light viewable, in which the pixel size of the individual component holograms is controlled preferably in a continuous fashion by such spatial coherence and in which the light intensity distribution of such pixel is favorable.

According to the preferred embodiment the spatial light modulator, which displays the individual images for each holographic pixel, may be moved in a one or two dimensional fashion within the input data plane of the above said objective between individual exposures such that higher resolution images may be attained for H1 master holograms.

Preferably, the spatial light modulator, which displays the individual images for each holographic pixel, may be moved in a one or two dimensional fashion within the input data plane of the objective between individual exposures such that a well-defined rectangular hologram viewing window may be created when directly writing a 1-step hologram.

According to another embodiment the spatial light modulator may remain fixed within the objective pupil and that any required translation (be this side-to-side or up/down) of the displayed image between individual exposures be accomplished by software.

Preferably, a combination of software image displacement and mechanical movement of the spatial light modulator may be used to attain an effective image translation in the input data plane of the objective.

Preferably, in the case of the generation of an H1 hologram, the element that controls the spatial coherence may be moved in a random or in an ordered fashion in such a way as to average out and reduce any pattern or spatial noise produced by such element in particular but also to reduce any other such optical noise arising in the system, thus improving the quality of holographic image.

According to a preferred feature, in the case of the generation of an H1 hologram, the packing density and size of the holographic pixels may be chosen, optimized or controlled in such a way as to average out or reduce any unwanted optical pattern or spatial noise thus improving the quality of holographic image.

In the case of the generation of an H1 hologram, it is preferred to optimize the laser output energy and the reference/object energy splitting ratio according to the packing density and size of the holographic pixels, thus improving the quality and brightness of holographic image.

In the case of die direct generation of the final hologram, it is preferred to choose, optimize or (continuously) control the packing density and size of the holographic pixels in such a way as to optimize the quality, brightness and depth of field of the holographic image.

In the case of the generation of an H1 hologram it is preferred to cause the reference beam distribution to track automatically the object beam in shape and position at the holographic film plane by an appropriate means such as a computer-controlled motorized image-planed variably magnified aperture.

Preferably, when a colour pulsed laser is used to produce either multiple-colour H1 holograms or multiple-colour 1-step holograms, three separate optical systems having controllable write-location of at least one of the optical wide-angle objectives are implemented permitting the writing of holographic pixels of different colour onto a panchromatic emulsion in parallel, such that either the holographic pixels of different colour can be made to line up or that the holographic pixels of different colour can be made to form a specific and controllable pattern.

Preferably, when a colour pulsed laser is used to produce multiple-colour H1 holograms, one multi-wavelength optical system is used and various wavelength critical elements in this optical system are replaced and selected automatically between exposures of different colours.

Data to write the holograms are preferably either generated by a 3-D computer model or are taken from a plurality of sequential camera shots. The holograms are recorded by laser light onto a suitable recording medium by means of a write head employing a spatial light modulator attached to a computer. The recording material or the write head is moved in a one or two-dimensional sense in order to write an array or matrix comprising a plurality of pixels.

According to an aspect of the present invention there is provided a holographic printer incorporating a pulsed laser for writing digital master holograms (H1).

According to an aspect of the present invention there is provided a holographic printer designed to print digital H1 master holograms and incorporating a pulsed laser, a SLM, an ultra-wide angle objective and a means for variably controlling the object beam spatial coherence.

Preferably, the SLM is static and effectively fills the input data plane of the ultra-wide angle objective.

Preferably, the SLM is moved, from one holopixel exposure to another, in a one or two-dimensional fashion in the input data plane of the wide angle objective.

Preferably, the wide angle objective has one or more of the following properties: (a) it is designed to work at a specific wavelength; (b) it has a beam waist significantly outside the objective; (c) it has low optical aberration and high resolution; (d) it has an effective field of view greater than 70 degrees; and (e) it has significant optical distortion (i.e. aberration described by the $5^{th}$ Seidel coefficient) requiring software (SLM) image correction.

Preferably, the method of variably controlling the object beam spatial coherence consists of using an adjustable telescope (creating an approximately collimated variable diameter laser beam) that illuminates a microlens array.

Preferably, the pulsed laser is a monochromatic pulsed laser having a pulse duration between 1 femtosecond and 100 microseconds and a temporal coherence of greater than 1 mm.

Preferably, the pulsed laser is a Neodymium laser that is further preferably either flashlamp or diode pumped.

Preferably, the pulsed laser is a multiple colour laser having a pulse duration of each colour component between 1 femtosecond and 100 microseconds and a temporal coherence of each colour component greater than 1 mm.

Preferably, the holographic pixel size of any produced hologram is optimized and controlled to achieve the best image fidelity.

Preferably, at least some of the electromechanical translation and rotation stages employed therein are controlled by a special controller that allows constant velocity and non-linear movement trajectories of said electromechanical stages to be programmed, thus assuring the smooth and proper precise movement of at least several such stages at high rates of exposure.

Preferably, the SLM is a high resolution LCD.

Preferably, software image distortion algoritiuns are applied for each holographic pixel written in order to correct for the inherent optical distortion in the optical system of the printer and to assure a non-distorted hologram replay image under a certain final illumination light geometry.

Preferably, the method of variably controlling the object beam spatial coherence is arranged so as not to induce significant speckle noise into the final hologram.

Preferably, software image distortion algorithms are applied to each image sent to the SLM, the exact form of such distortions being calculated with reference to the position of the SLM in the objective input data plane and the holographic pixel being written, in order to correct for the inherent optical distortion in the optical system of the printer and to assure a non-distorted hologram replay image under a certain final illumination light geometry.

According to a further aspect of the present invention there is provided a digital holographic printer, designed to print digital H1 master holograms, incorporating a pulsed laser, one or more SLMs, one or more wide angle objectivcs and a method for variably controlling the spatial coherence of each object beam.

According to a further aspect of the present invention there is provided a digital holographic printer, designed to print digital H1 master reflection holograms, incorporating a multiple colour pulsed laser, 3 or more SLMs, 3 or more wide-angle objectives, a means for variably controlling the spatial coherence of each object beam and a means of variably adjusting the spacing between holopixels of different colour.

According to a further aspect of the present invention there is provided a digital holographic printer, designed to print digital H1 master reflection holograms, incorporating a multiple colour pulsed laser, 3 or more SLMs, 3 or more wide-angle objectives, a means for variably controlling the spatial coherence of each object beam and where the spacing between holopixels of different colour is fixed and may or may not be zero.

According to a further aspect of the present invention there is provided a digital holographic printer, designed to print digital H1 master reflection holograms, incorporating a multiple colour pulsed laser, 1 SLM, 3 or more wide-angle objectives that can be automatically or manually inserted into or retracted from a critical position in one principal optical circuit and a means for variably controlling the spatial coherence of the object beam, such holographic printer printing sequentially in one colour and then making another pass for the next colour.

According to a further aspect of the present invention there is provided a digital holographic printer, designed to print digital H1 master reflection holograms, incorporating a colour pulsed laser where one colour channel is written first after which the printer makes another pass writing the next colour and so forth, such passes either being an entire print line, part of a print line, a region to be printed or the entire region to be printed.

According to a further aspect of the present invention there is provided a digital holographic printer, designed to print digital H1 master reflection holograms, incorporating a colour pulsed laser where one or more colour channels are written at the same time.

According to a further aspect of the present invention there is provided a digital holographic printer, designed to print digital H1 master reflection holograms, incorporating a colour pulsed laser where one or more optical elements are replaced by holographic optical elements.

According to a further aspect of the present invention there is provided a digital holographic printer, designed to print digital H1 master reflection holograms, incorporating a pulsed laser where one or more optical elements are replaced by holographic optical elements.

According to a further aspect of the present invention there is provided a digital holographic printer, designed to print digital H1 master transmission holograms, incorporating a colour pulsed laser of 3 or more colours, where 3 or more master holograms, one for each colour, is recorded on a different holographic film or plate.

According to a further aspect of the present invention there is provided a digital holographic printer, designed to print digital H1 master transmission holograms, incorporating a colour pulsed laser of 3 or more colours, 3 or more SLMs. 3 or more wide-angle objectives, a method for variably controlling the spatial coherence of each object beam where 3 or more master holograms, one for each colour, is recorded on a different holographic film or plate.

According to a further aspect of the present invention there is provided a digital holographic printer, designed to print digital H1 master transmission holograms, incorporating a colour pulsed laser of 3 or more colours, 1 SLM, 3 or more wide-angle objectives that can be automatically or manually inserted into or retracted from a critical position in one principal optical circuit and a method for variably controlling the spatial coherence of the object beam, where 3 or more master holograms, one for each colour, is recorded on a different holographic film or plate.

According to an embodiment software image distortion algorithms are applied to each image sent to the SLM in order to correct for the inherent optical distortion in the wide angle objective of the printer.

According to a preferred feature an image-planed aperture is used to control the size and shape of the reference beam. Preferably, said aperture is moved in a one or two dimensional fashion in order to accurately modify the location of the reference beam on the holographic film plane. Preferably, the reference beam is made to automatically track the object beam at the holographic film plane. Preferably, the distance of the objective from the holographic film plane is controlled so as to change the holographic pixel size.

Preferably, the spatial coherence of the object beam is controlled to change and optimize the diameter of the object beam at the location of its minimum beam waist after passing through the wide angle objective.

Preferably, image fidelity of the hologram is further optimized by choosing the spatial density of holographic pixels written. Further preferably the density is varied from region to region in the hologram.

Preferably, the element that controls the spatial coherence of the object beam is moved in a random or particular fashion between holopixel exposures so as to diminish any noise that would otherwise deteriorate the quality of the written hologram.

Preferably, the SLM is moved toward and away from the wide angle objective on a precision stage so as to control the optimum H1–H2 transfer distance when the master hologram is finally transferred to an H2 hologram.

Preferably, in the case of a static SLM, the required image translation within the input data plane of the objective is accomplished by software.

Preferably, an H1 master hologram is written which is designed to be image-plane transferred to create a single colour channel rainbow hologram, said H1 master hologram consisting of a single line of strongly overlapping holographic pixels.

Preferably, an H1 master hologram is written which is designed to be image-plane transferred to create a multiple colour channel rainbow hologram, said H1 master hologram consisting of a several lines, vertically displaced, of strongly overlapping holographic pixels.

Preferably, an H1 master hologram is written which is designed to be image-plane transferred to create a single colour channel reflection hologram of either full or horizontal parallax, the master hologram consisting of a 2-dimensional matrix of strongly overlapping holographic pixels.

Preferably, an H1 master hologram is written which is designed to be image-plane transferred to create a single colour channel reflection hologram of either full or horizontal parallax, the master hologram consisting of a 2-dimensional matrix of strongly overlapping holographic pixels whose density is a general function of the Cartesian pixel coordinates on the holographic substrate.

Preferably, an H1 master hologram is written which is designed to be image-plane transferred to create a single parallax single colour-channel reflection hologram, the H1 master hologram consisting of a 2-dimensional matrix of strongly overlapping holographic pixels whose density in the vertical and horizontal directions is not the same.

Preferably, an H1 master reflection hologram is written which is designed to be image-plane transferred to create a multiple colour reflection hologram of either full or horizontal parallax, the H1 master hologram consisting of a 2-dimensional matrix of strongly overlapping holopixels.

Preferably, an H1 master reflection hologram is written which is designed to be image-plane transferred to create a single parallax multiple colour-channel reflection hologram, the H1 master hologram consisting of a 2-dimensional matrix of strongly overlapping holographic pixels whose density in the vertical and horizontal directions is not the same.

Preferably, an H1 master reflection hologram is written which is designed to be image-plane transferred to create a single or full parallax multiple colour-channel reflection hologram, the H1 master hologram consisting of a 2-dimensional matrix of strongly overlapping holographic pixels whose density is a general function of the Cartesian pixel coordinates on the holographic substrate.

Preferably, an H1 master reflection hologram is written which is designed to be image-plane transferred to create a single or full parallax multiple colour-channel reflection hologram, the H1 master hologram consisting of a 2-dimensional matrix of weakly overlapping holographic pixels whose density is a general function of the Cartesian pixel coordinates on the holographic substrate.

Preferably, an H1 master reflection hologram is written which is designed to be image-plane transferred to create a single or full parallax multiple colour-channel reflection hologram, the H1 master hologram consisting of a 2-dimensional matrix of weakly overlapping or abutting holographic pixels, interlaced by colour and whose density is a general function of the pixel Cartesian coordinates on the holographic substrate.

Preferably, an H1 master hologram is written which is designed to be image-plane transferred to create a either a multiple colour channel rainbow hologram or an achromatic transmission hologram, each holopixel being written by an object beam whose propagation vector is parallel to the normal vector of the holographic film.

Preferably, an H1 master hologram is written which is designed to be image-plane transferred to create a either a multiple colour channel rainbow hologram or an achromatic transmission hologram, each holopixel being written by an object beam whose propagation vector makes an angle to the normal vector of the holographic film. Further preferably, said angle is the achromatic angle.

According to an embodiment there is provided a digital holographic printer designed to print digital H1 master holograms, incorporating a pulsed laser, multiple SLMs, multiple wide angle objectives, a method of variably controlling the spatial coherence of each object beam and a method of variably adjusting the spacing between holopixels written by each wide-angle objective.

According to an embodiment there is provided a digital holographic printer designed to print digital H1 master holograms, incorporating a multiple colour pulsed laser, multiple SLMs, multiple wide angle objectives, a method of variably controlling the spatial coherence of each object beam and a method of variably adjusting the spacing between holopixels written by each wide-angle objective.

According to a further aspect of the present invention there is provided a holographic printer for directly writing 1-step white-light viewable holograms comprising:
  a laser source arranged to produce a laser beam at a first wavelength;
  a lens system for directly writing a hologram comprising a plurality of holographic pixels on to a photosensitive medium;
  positioning means arranged and adapted to position the photosensitive medium substantially at the Fourier plane of the lens system;
  wherein:
  the laser source comprises a pulsed laser source; and
  the holographic printer further comprises automatic spatial coherence varying means for automatically varying the spatial coherence of the laser beam so as to control in a continuously variable fashion the diameter of the object laser beam at the Fourier plane.

The step of using a pulsed laser as the laser source of a holographic printer is particularly advantageous since it enables the printer to operate without sensitivity to external or internal vibration or slight temperature fluctuations. In addition the speed of printing is fundamentally increased as there is no need to wait for vibration to dissipate before making an exposure. Thus the write speed is essentially determined by the refresh rate of the SLM used. Accordingly the preferred embodiment can work several orders of magnitude faster than conventional printers which use a CW laser and with a reliability of operation fundamentally higher.

The positioning of the photosensitive material, in use, at substantially the Fourier plane is optimal as at any other plane significant holopixel overlap on the surface of the photosensitive material would be required in order not to produce apparently sparsely pixelated holograms. This is because light rays cross over each other at the Fourier plane. Thus, in the case that the Fourier plane is at a distance, L, from the photosensitive material, the final image will appear to be made up of holopixels, located at this distance L from the photosensitive material. The apparent width of these pixels will be equal to the object beam diameter at the Fourier plane which is always less than the size of the object beam at the surface of the photosensitive material. Thus, in the case that the photosensitive material is not substantially at the Fourier plane, in order to properly abut neighbouring holopixels significant overlap of the object beam footprints of such neighbouring holopixels on the photosensitive material would be required, thus reducing the hologram diffractive efficiency.

The fact that the holographic printer further comprises an automatic spatial coherence varying means for automatically varying the spatial coherence of the laser beam allows the diameter of the object laser beam at the Fourier plane to be controlled. This then means that the size of the holopixel may be controlled. Since different formats of hologram require fundamentally different pixel sizes it is highly desirable to be able to continuously change this diameter.

Preferably, the automatic spatial coherence varying means comprises an adjustable telescope and a microlens array, wherein the adjustable telescope is arranged to create an approximately collimated variable diameter laser beam that illuminates said microlens array. The telescope is arranged to illuminate a variably controllable area of the microlens array and the lenslet pitch of the lens array may be chosen such that individual lenses emit radiation that substantially does not superpose to create speckle. Thus it is possible to effectively and simply control the diameter of the object beam at the Fourier plane and also to create a high fidelity image of the LCD screen effectively illuminated by the ensemble of radiative lenslet sources and substantially free of speckle.

Preferably, the printer further comprises a translatable spatial light modulator arranged downstream of the automatic spatial coherence varying means and upstream of said lens system. In the case that holograms are to be illuminated for display with a collimated beam of white light, translating the LCD provides a convenient and efficient way of producing holograms with rectangular viewing zones. A rectangular viewing window is desirable, as an observer viewing the hologram will either see the entire image or no image at all. This should be contrasted to the case of a scrolling viewing window where an observer sees, for much of the time, only part of the holographic image. By translating the LCD a hologram with a certain rectangular viewing zone can be produced with a lower resolution LCD then would otherwise be required if the LCD remained static.

Preferably, the printer further comprises means for modifying images sent to the spatial light modulator so as to at least partially correct for inherent optical distortions of said printer. In a preferred embodiment the holographic printer comprises means for pre-distorting images sent to a spatial light modulator. Software correction of the digital computer images prior to their display on the spatial light modulator is a highly desirable preferred feature of the present invention. This is because, in order to design suitable wide angle objectives for a holographic printer, better performance in eliminating aberrations characterised by the first four Seidel coefficients may be realised if some optical distortion ($5^{th}$ coefficient) is accepted. Thus effectively a better objective limiting resolution and a better objective field of view may be attained in the case that the wide angle objective possesses some barrel or pincushion distortion. Since, for many types of hologram, different colour channels must be written which must exactly register, the use of software image correction is particularly advantageous.

In many cases, holograms are illuminated for display with a non-collimated beam of white light emanating from a point source such as a halogen lamp. If account is not taken of the replay illumination geometry and further a constant angle of reference is employed at recording, both image distortion and viewing window distortion will occur on illumination of the hologram by a diverging beam. By using a combination of image pre-distortion based on a diffractive model, one or two-dimensional translation of the LCD and by moving the reference beam in only one dimension at each holopixel exposure, any induced image distortion can be compensated for and a very much improved hologram viewing window may be attained. Thus the combination of a one dimensionally changeable reference beam, a translatable LCD and software image distortion are highly desirable, particularly for larger holograms.

Preferably, the lens system has an effective field of view greater than 70 degrees.

Preferably, the Fourier plane of the lens system is located downstream of said lens system, preferably at least 1 mm, 1.5 mm, 2 mm or 2.5 mm downstream of the lens system.

Preferably, the laser source is arranged to additionally produce laser beams at second and third wavelengths, the first, second and third wavelengths each differing from one another by at least 30 nm.

Preferably, the printer further comprises a second and a third laser source for producing laser beams at second and third wavelengths, the first, second and third wavelengths each differing from one another by at least 30 nm.

Preferably, the printer further comprises a first lens system for use at said first wavelength, a second lens system for use at said second wavelength, and a third lens system for use at said third wavelength, wherein the first, second and third lens systems are arranged so that a desired lens system may be automatically selected.

According to a further aspect of the invention there is provided a holographic printer for directly writing 1-step white-light viewable holograms comprising:
   a laser source arranged to produce a laser beam at a first wavelength;
   a lens system for directly writing a hologram comprising a plurality of holographic pixels on to a photosensitive medium;
   positioning means arranged and adapted to position the photosensitive medium substantially at the Fourier plane of the lens system;
   wherein:
   the laser source comprises a pulsed laser source.

According to a yet further aspect of the invention there is provided a method of directly writing 1-step white-light viewable holograms, comprising:
   providing a laser source arranged to produce a laser beam at a first wavelength;
   providing a lens system for directly writing a white-light viewable hologram comprising a plurality of holographic pixels on to a photosensitive medium;
   positioning a photosensitive medium substantially at the Fourier plane of said lens system;
   wherein:
   the laser source comprises a pulsed laser source; and
   the method further comprises the step of:
   automatically varying the spatial coherence of the laser beam so as to control in a continuously variable fashion the diameter of the object laser beam at the Fourier plane.

According to a further aspect of the present invention there is provided a holographic printer for directly writing 1-step white-light viewable holograms comprised of a plurality of holographic pixels, the holographic printer comprising:
   a laser source arranged to produce a laser beam at a first wavelength, the laser beam being arranged to be split into an object beam and a reference beam;
   a spatial light modulator arranged to operate on the object beam;
   a lens system for directly writing a holopixel on to a photosensitive medium;
   positioning means arranged and adapted to position the photosensitive medium substantially at the Fourier plane of the lens system;
   wherein:
   the laser source comprises a pulsed laser source;
   the spatial light modulator is translatable;
   said holographic printer further comprises:
   means for varying in one dimension only the direction of the reference beam at the Fourier plane after the formation of a said holopixel;
   automatic spatial coherence varying means for automatically varying the spatial coherence of the laser beam so as to control the diameter of the object laser beam at the Fourier plane; and
   means for pre-distorting images sent to the spatial light modulator.

According to a further aspect of the present invention there is provided a 1-step digital holographic printer incorporating a pulsed laser.

According to a further aspect of the present invention there is provided a 1-step digital holographic printer incorporating a pulsed laser, SLM, wide angle objective and a method for variably controlling the object beam spatial coherence. Preferably, the SLM is static and effectively fills the input data plane of the wide angle objective. Alternatively the SLM is moved, from one holopixel exposure to another, in a one or two dimensional fashion in the input data plane of the wide angle objective.

Preferably, the wide angle objective has one or more of the following properties: (a) it is designed to work at a specific wavelength, (b) it has a beam waist significantly outside the objective, (c) it has low optical aberration and high resolution, (d) it has an effective field of view greater than 70 degrees, and (e) it has significant optical distortion (ie aberration caused by the $5^{th}$ Seidel coefficient) requiring software (SLM) image correction.

Preferably, the method of variably controlling the object beam spatial coherence consists of using an adjustable telescope (creating an approximately collimated variable diameter laser beam) that illuminates a microlens array.

Preferably, the pulsed laser used in the printer is a monochromatic pulsed laser having a pulse duration between 1 femtosecond and 100 microseconds and a temporal coherence of greater than 1 mm.

Preferably, the pulsed laser is a Neodymium laser that is either flashlamp or diode pumped.

Preferably, the pulsed laser is a multiple colour laser having a pulse duration of each colour component between 1 femtosecond and 100 microseconds and a temporal coherence of each colour component greater than 1 mm.

Preferably, the holographic pixel size of any produced hologram is optimized and controlled for each case by changing the object beam spatial coherence.

Preferably, at least some of the electromechanical translation and rotation stages employed are controlled by a controller that allows constant velocity and non-linear movement trajectories of said electromechanical stages to be programmed, thus assuring the smooth and proper precise movement of at least several such stages at high rates of exposure.

Preferably, the SLM is a high resolution LCD.

Preferably, software image distortion algorithms are applied for each holographic pixel written in order to correct for the inherent optical distortion in the wise angle objective of the printer and to assure a non-distorted hologram replay image under a certain final illumination light geometry.

Preferably, the method of variably controlling the object beam spatial coherence does not induce significant speckle noise into the final hologram.

Preferably, software image distortion algorithms are applied to each image sent to the SLM in order to correct for the inherent optical distortion in the wide angle objective of the printer and to assure a non-distorted hologram replay image under a certain final illumination light geometry.

Preferably, software image distortion algorithms are applied to each image sent to the SLM, the exact form of such distortions being calculated with reference to the position of the SLM in the objective input data plane and the holographic pixel being written, in order to correct for the inherent optical distortion in the optical system of the printer and to assure a non-distorted hologram replay image under a certain final illumination light geometry.

Preferably, when a colour pulsed laser is used to produce multiple-colour 1-step holograms, one multi-wavelength optical system is used and various wavelength critical elements in this optical system are replaced and selected automatically between exposures of different colours.

According to a further aspect of the present invention there is provided a 1-step digital holographic printer incorporating a pulsed laser, one or more SLMs, one or more wide angle objectives and a method for variably controlling the spatial coherence of each object beam.

According to a further aspect of the present invention there is provided a 1-step digital holographic printer incorporating a multiple colour pulsed laser, 3 or more SLMs, 3 or more wide-angle objectives, a method for variably controlling the spatial coherence of each object beam and a method of variably adjusting the spacing between holopixels of different colour.

According to a further aspect of the present invention there is provided a 1-step digital holographic printer incorporating a multiple colour pulsed laser, 3 or more SLMs, 3 or more wide-angle objectives, a method for variably controlling the spatial coherence of each object beam and where the spacing between holopixels of different colour is fixed and may or may not be zero.

According to a further aspect of the present invention there is provided a 1-step digital holographic printer incorporating a multiple colour pulsed laser, 1 SLM, 3 or more wide-angle objectives that can be automatically or manually inserted into or retracted from a critical position in one principal optical circuit and a method for variably controlling the spatial coherence of the object beam, such holographic printer printing sequentially in one colour and then making another pass for the next colour.

According to a further aspect of the present invention there is provided a 1-step digital holographic printer incorporating a multiple colour pulsed laser where one colour channel is written first after which the printer makes another pass writing the next colour and so forth, such passes either being an entire print line, part of a print line, a region to be printed or the entire region to be printed.

According to a further aspect of the present invention there is provided a 1-step digital holographic printer incorporating a multiple colour pulsed laser where one or more colour channels are written at the same time.

Preferably, an image-planed aperture is used to control the size and shape of the reference beam.

Preferably the laser energy and reference to object energy ratio is chosen so as to optimize the brightness and quality of the final hologram.

Preferably the size of the reference beam is always matched to the size of the object beam at the photosensitive material surface.

Preferably, an image-planed aperture is used to control the size and shape of the reference beam whilst maintaining effective beam collimation and low beam divergence.

According to a further aspect of the present invention there is provided a digital holographic printer, designed to print directly 1-step holograms, incorporating a colour pulsed laser where one or more optical elements are replaced by holographic optical elements.

According to a further aspect of the present invention there is provided a digital holographic printer, designed to print directly 1-step holograms, incorporating a pulsed laser where one or more optical elements are replaced by holographic optical elements.

According to an embodiment there is provided a digital holographic printer designed to print directly 1-step digital holograms, incorporating a pulsed laser, multiple SLMs, multiple wide angle objectives, a method of variably controlling the spatial coherence of each object beam and a method of variably adjusting the spacing between holopixels written by each wide-angle objective.

According to an embodiment there is provided a digital holographic printer designed to print digital 1-step holograms, incorporating a multiple colour pulsed laser, multiple SLMs, multiple wide angle objectives, a method of variably controlling the spatial coherence of each object beam and a method of variably adjusting the spacing between holopixels written by each wide-angle objective.

According to a further aspect of the present invention, there is provided a holographic printer operable in a first mode for directly writing 1-step white-light viewable holograms and in a second mode for writing master holograms (H1) which are convertible by a process known per se to white-light viewable holograms (H2). Such dual purpose holographic printers have not been previously contemplated.

In order to illustrate the differences between the embodiment directed to 2-step printing processes and conventional 2-step holographic printing processes, reference is made to FIG. 17 which contrasts the preferred arrangement (bottom diagram) and with conventional methods (top diagram). In the known arrangements a focused image of a spatial light modulator 1701 is created on the diffusion screen 1703 using objective lens 1702. The diffusion screen scatters the impinging light in a wide variety of directions. A photosensitive material 1705 covered by a movable aperture 1706, which may be a general rectangle, allows the envelope of rays delineated by 1717 and 1716 to irradiate that part of the surface of the material 1705 which is left uncovered by the aperture hole 1707. A mutually coherent reference beam is brought in from A to B such as to create a small transmission hologram at the region 1704 which may be referred to as a holographic pixel. By moving the aperture in a one or two-dimensional fashion, changing the SLM image to the appropriate perspective view and by effecting an exposure, a composite transmission hologram is built up from holographic pixels having a shape defined by the aperture used. In the known arrangement the aperture is a slit and movement is one-dimensional. The known arrangement could be generalized to two-dimensional movement and a rectangular or square aperture. The resultant composite transmission hologram is then transferred in the prior art to an H2 white-light viewable hologram by conjugate illumination of the processed hologram using a replay beam 1708 whose direction of propagation is B to A. This process produces a real image at the spatial location 1703. Specifically, by covering up the processed hologram 1705 with an aperture 1706 so as to only illuminate the holographic pixel 1704 by the reference beam 1708, the exact same unage is now projected onto the diffusion screen 1703 by the hologram as was used to record the pixel 1704.

In the present invention no diffusion screen is used. Instead, according to a preferred embodiment, a highly specialized wide angle objective 1714 is used to form a focused image of the SLM 1715 at the spatial location 1709. No material surface is present at the image plane 1709. Instead the photosensitive film 1712 is placed somewhat downstream of the plane of minimum beam waist as shown. The image at 1715 is generally shifted (either by the LCD being shifted with respect to the objective lens or by software) with respect to the image 1701 either in a one dimensional fashion or a two dimensional fashion. In this way the ray 1717 in the bottom diagram corresponds exactly to the time-reversed ray 1717 in the top diagram and likewise for 1718. Since there exists a time-reversal transformation between these two sets of rays a time reversed reference beam 1711 propagating from D to C is used. Thus, as above, a holographic pixel is created at location 1713. By moving the SLM 1715, the objective lens 1714 and the reference beam 1711 together in a one or two dimensional (translating) fashion over the surface of the photosensitive film a composite transmission hologram is recorded. This hologram 1712 is conjugate to the hologram 1705. Hence if composite hologram 1712 is chemically processed and then illuminated by the same reference beam 1711 propagating from D to C, care is taken only to illuminate one holographic pixel at a time and a diffusion screen is placed at the location 1709, the exact same images will be observed, projected onto the diffusion screen, as we retrieved using the prior art described above.

Thus the preferred arrangement has many advantages over known arrangements including an energy requirement orders of magnitude lower than the prior art, dramatically increased system flexibility, lower noise results, higher speed operation and fundamentally smaller printer size.

BRIEF DESCRIPTION OF THE DRAWINGS

Various embodiments of the present invention will now be described, by way of example only, and with reference to the accompanying drawings in which:

FIG. 8($b$) illustrates the overlapping object beam density pattern recorded on the holographic material typical of an H1 master hologram written for the creation of a full-colour rainbow hologram by conventional transfer with each ellipse containing the perspective information for a certain viewpoint, the three rows representing the three primary colour separations;

DETAILED DESCRIPTION OF THE INVENTION 5.1 Fundamental Image Data Required

Figure 1:
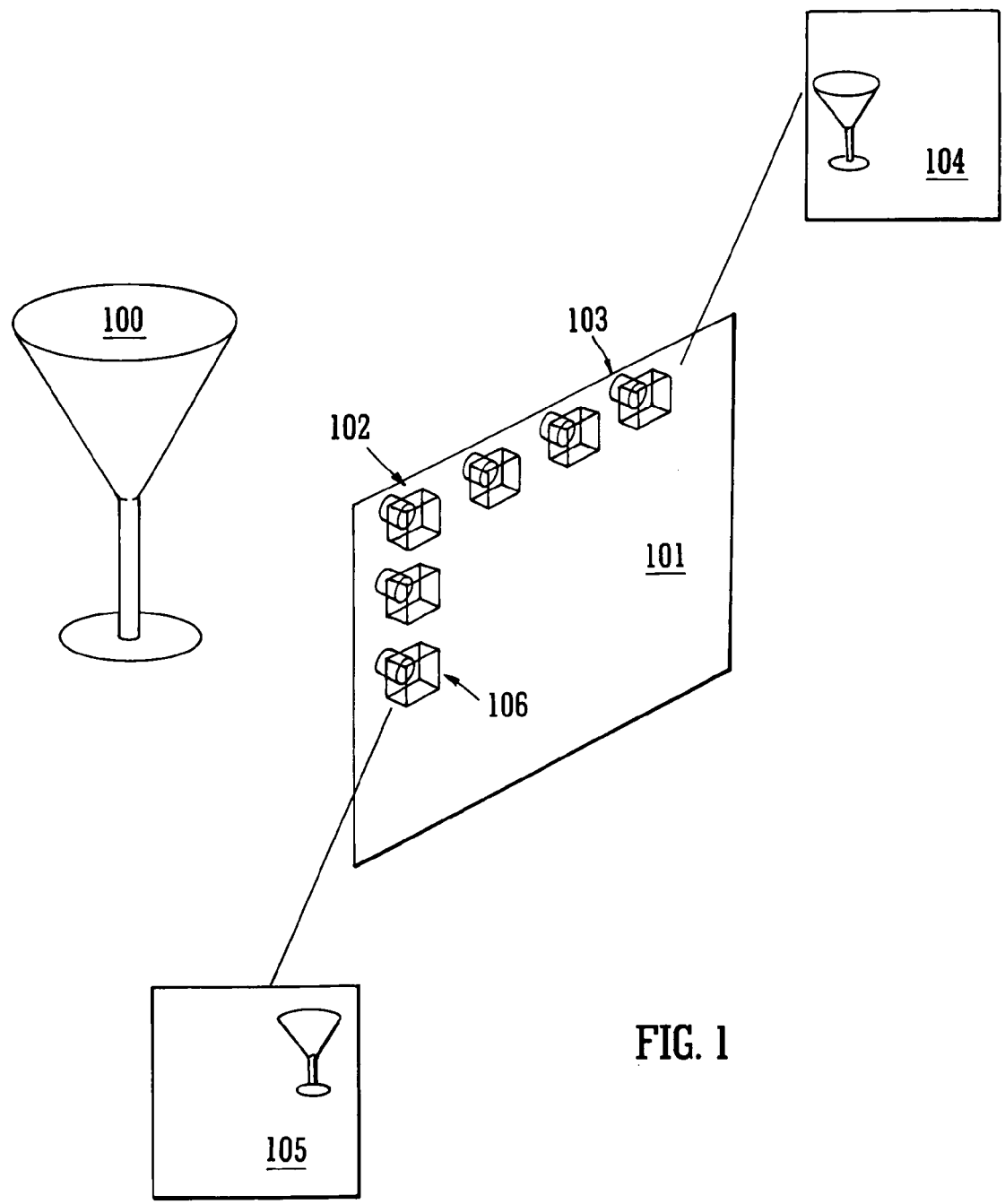
FIG. 1 illustrates the process of acquiring data from a series of sequential camera shots that can be used to generate the digital holograms in addition to illustrating a computer model of an object where a viewing plane is defined on which perspective views are generated.

In one embodiment of this invention a computer is used to generate a three dimensional model of an object using a standard commercial computer program. Such computer programs can nowadays produce very lifelike models using a variety of sophisticated rendering processes that mimic real life effects. In addition advances in computer technology have now seen the calculation times, required for such programs to run, dramatically decreased. Three dimensional scanners using Moire or other principles now permit the incorporation of real world 3-D images in such computer models. The storage memory required for such 3-D models is largely dependent on the texture maps used therein and hence computer files representing such 3-D models are usually relatively small and may be transmitted over the internet easily. In the preferred embodiment of this invention said 3-D computer models are used to generate a series of 2-D camera views from a virtual viewing plane as shown in FIG. 1. Here the viewing plane is labeled 101 and individual 2-D images, such as 105 and 104, of the computer represented object 100 are generated at multiple locations on the viewing plane such as 102 and 103. The spacing and density of such 2-D views are generally controlled according to the information required for a certain type of hologram but in one embodiment they form a regular 2-D matrix and in another a regular horizontal 1-D array. Departures from such regular forms are useful for various reasons such as, but not limited to, reducing hologram image noise while controlling image blurring.

In another embodiment of the invention a real model is used instead of a computer representation and a real camera is employed to record individual photographs (either digitally or via photographic film that is subsequently digitized). In such a case FIG. 1 should be interpreted in the following fashion. Object 100 represents the object to be holographed. 101 represents the plane on which a camera 102 is positioned and photographs of the object 100 are taken at a variety of positions on this plane. For example the view position 106 yields the photograph 105 and the view position 103 yields the photograph 104. Generally some mechanism is used to transport a camera from position to position in a sequential fashion using a 1 or 2 dimensional translation stage to accomplish this. As before, the spacing and density of such 2-D views are generally controlled according to the information required for a certain type of hologram but in one embodiment they form a regular 2-D matrix and in another a regular horizontal 1-D array. Departures from such regular forms are useful for various reasons such as, but not limited to, reducing hologram image noise while controlling image blurring.

In both of the above cases restricted animation, which may be transferred to the final hologram, may be modeled by arranging that the model 100 moves in a defined sense (representing such animation) as different camera positions are selected on the plane 101, such camera positions following sequential monotonic trajectories on said plane. On observing the final hologram, an observer following such sequential monotonic trajectory in the observation space will perceive said animation.

5.2 Basic Principles

The preferred embodiment works by taking a set of 2-D views of a real or computer represented object and processing such views digitally to generate data that is displayed on a spatial light modulator in two dimensions. According to a particularly preferred embodiment the spatial light modulator is a high resolution liquid crystal display, but it should be understood that, in less preferred embodiments, any other form of 2-D spatial light modulator having appropriate characteristics may be used.

In the preferred embodiment of the invention a pulsed laser is used to illuminate this spatial light modulator. Such pulsed laser may be a single colour or a multiple colour laser and may produce pulses having characteristic times from nanoseconds to tens of microseconds. The repetition rate of such laser should ideally allow operation at speeds approaching the refresh rate of the chosen spatial light modulator. The use of a pulsed laser allows the construction of a commercial machine that is not affected by vibration. Hence high quality holograms may be produced rapidly and predictably by the use of such device. The temporal coherence and pulse to pulse energy variation of such laser should be chosen carefully. Generally, if object and reference beam arms are equalized the required temporal coherence is of the order of a few centimeters. The ultimate choice of pulse duration must depend of the individual reciprocity relations of a given holographic recording material. If necessary pulse trains may be employed to achieve longer pulse envelopes whist preserving the peak electric field which is useful for non-linear frequency conversion.

A special illumination system for the spatial light modulator is used that controls the spatial coherence of the laser beam in an easily adjustable fashion. In the preferred embodiment of the invention a telescope and micro-lens array are employed for this purpose although it must be understood that other suitable systems for controlling, in an easily adjustable fashion, the spatial coherence of a laser beam exist and may be substituted. Such systems are characterized by those systems that control the spatial coherence of a laser beam in an easily adjustable fashion whilst not introducing significant speckle noise. The known arrangement disclosed by Yamagushi et al. ("High Quality recording of a full-parallax holographic stereogram with digital diffuser", Optical Letters vol 19, no 2 pp 135–137 Jan. 20, 1994) uses a pseudorandom diffuser directly in front of the SLM in order to limit the spatial coherence without inducing speckle noise. However, this system does not allow the spatial coherence to be variably changed.

A microlens array consists of a two-dimensional ordered matrix of micro-lenses. Each lenslet has a certain diameter and focal length and the array is characterized by the centre to centre spacing between adjacent lenslets. When illuminated by coherent light of high spatial coherence each lenslet acts as an effective individual source and produces a cone of diverging radiation. Downstream of the lens array, radiation from each lenslet will be superposed. A screen placed to intersect the plurality of radiation emanating from each lenslet will in general show speckle noise. However, if the individual lenslets are sufficiently widely spaced then essentially there will be no speckle as the phase information between individual sources becomes random. It is, however, important to understand that as the lenslet to lenslet distance is increased the number of radiation sources in a certain area, A, decreases rapidly. The area, A, of the illuminated part of the lens array essentially dictates, in the present system, the spatial coherence. The number of radiation sources or lenslets within this area then dictates the uniformity of the final SLM illumination beam through ensemble averaging. Since a pulsed laser is used in the present invention the techniques of beam cleaning that are used routinely in CW holography cannot normally be used due to electro-optic breakdown and thus the illumination beam is intrinsically less spatially uniform. Therefore as much ensemble averaging from the plurality of lenslet sources as possible is required. In general we calculate optimum lens array specifications and those of the lens array illumination telescope by a combination of conventional raytracing and computationally calculating the speckle pattern at the final hologram plane.

The laser light passing through the spatial light modulator passes through a special wide-angle objective lens that focuses the light into a tight waist outside of such objective forming a beam known as the object beam. An image of the spatial light modulator is formed at a specific and controllable distance from the waist. An holographic recording material is placed near or at such minimum waist of the object beam. A reference beam which is mutually coherent to this object beam is also brought to illuminate the same physical region of the recording material but from a different angle such that the reference and object beams interfere in the region to produce an interference pattern which is recorded by the recording material.

In one embodiment of the invention the holographic material is moved in a one or two dimensional fashion with respect to the object beam in a plane determined by the optimal overlap of the object and reference beams, whilst the image on the spatial light modulator is changed such that each adjacent position of the object/reference beam pair on the recording material is encoded with an interference pattern characteristic of such different computer data. Alternatively the object/reference beam pair is moved and the recording material stays fixed (at least in one dimension). In either case such a method leads to the creation of a plurality of individual interference patterns (known henceforth as holographic pixels) which form a 2-D matrix or one or more 1-D arrays of such pixels. Such plurality of pixels is known as a composite hologram.

It is desirable that the size and intensity distributions of both the object and reference beams are accurately controlled dependent upon the type of hologram being written and upon the required characteristics of such hologram. In the case of the object beam this is done by controlling the spatial coherence of the laser light, in the case of writing a 1-step hologram, or by changing the distance of the holographic film from the wide angle objective in the case of an H1 master hologram. The size of the reference beam may be effectively controlled by image planing an aperture onto the recording material surface using an adjustable telescope, taking care to maintain beam collimation and divergence within acceptable limits.

It is also desirable that a wide angle objective is designed and incorporated which both minimizes aberrations and which maintains a location of minimum waist outside of such objective. The arrangement disclosed by Yamagushi et al. ("Development of a prototype full-parallax holoprinter", Proc. Soc. Photo-Opt Instrum. Eng (SPIE) vol. 2406, Practical Holography IX, pp 50–56 February 1995) used a 3 lens objective that minimized spherical aberration ($1^{st}$ Seidel coefficient) and achieved an fnumber of 0.79.

Figure 11:
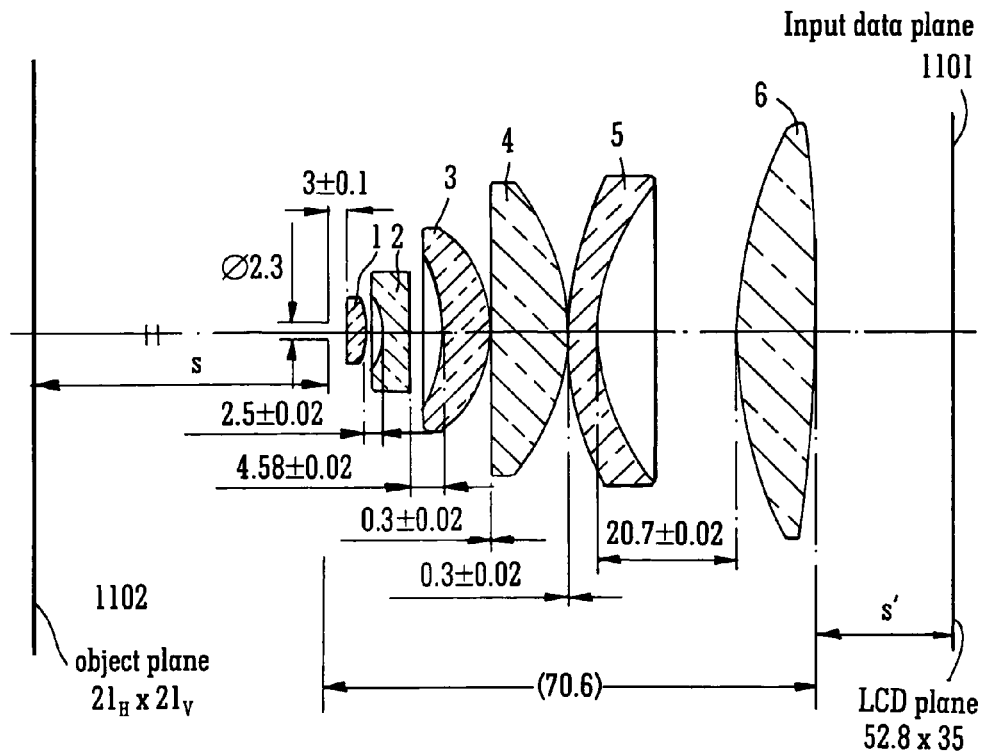
FIG. 11 shows an example of a wide angle objective used in one particularly preferred embodiment (optimized for 526.5 nm) having high resolution, low aberration, variable focal plane distance and a position of minimum beam waist significantly outside the objective.
Figure 12:
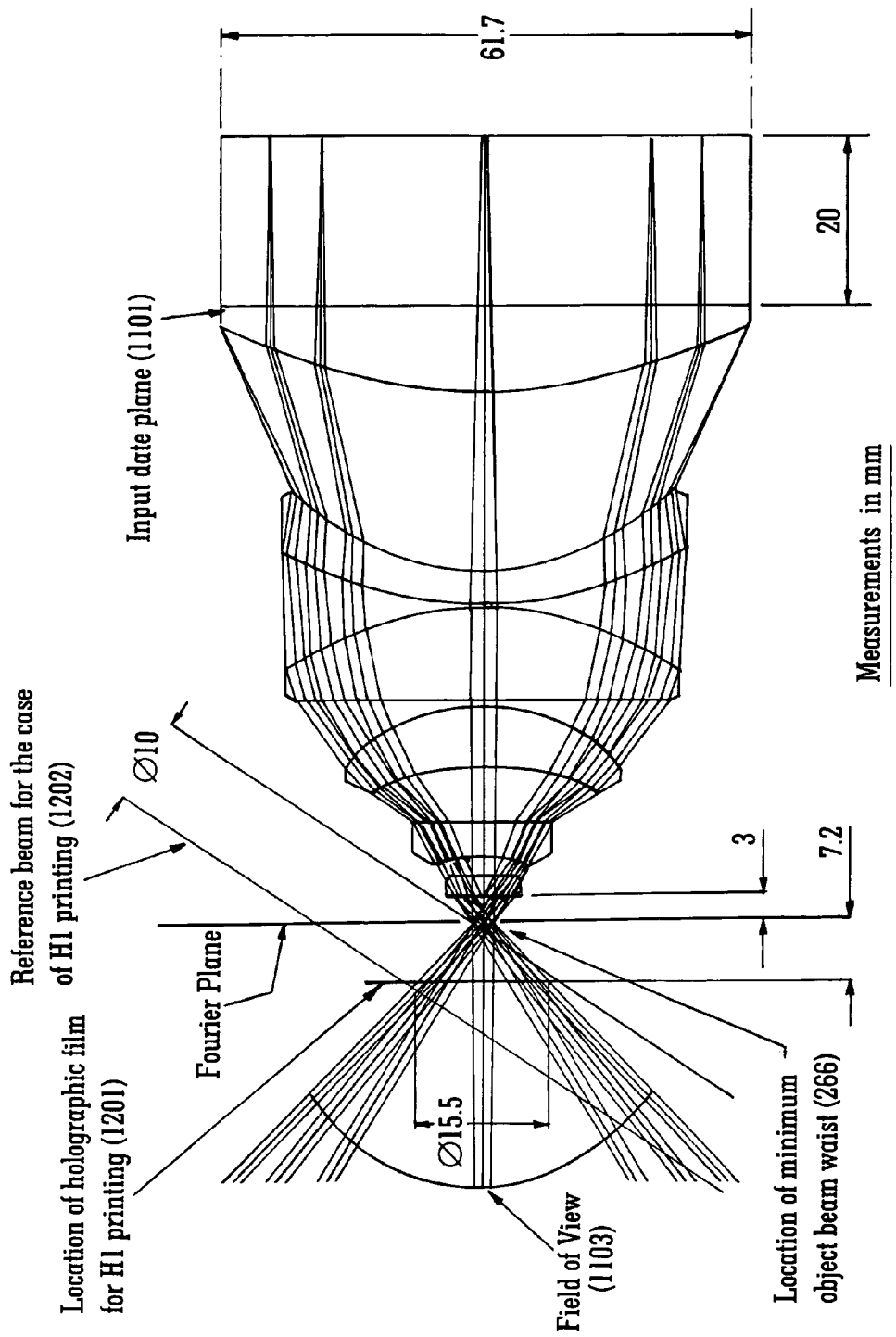
FIG. 12 shows a ray trace for the objective of FIG. 11 detailing various planes and key locations.

In general, the focal plane of the objective must be variable over a significant range; in the case of an H1 hologram, the focused SLM image distance corresponds exactly to the H1–H2 transfer distance and hence to the optimum viewing distance of the final H2 hologram. Aberrations corresponding to higher order Seidel coefficients must be also be minimized. Accordingly, we have identified an appropriate class of objectives, an example of which is shown in FIG. 11 which have exceedingly high field of view and the requisite properties of high resolution and low aberration over an extended range of focal plane distances. A characteristic of these objectives, which may be designed for various laser wavelengths, is that they exhibit significant optical distortion (see FIG. 14 in which a perfect rectangle on the object plane 1102 forms a rounded rectangle 1401 when traced back to the LCD which is situated on the input data plane 1101) and hence need to be corrected digitally by software. Such "Pincushion" or "Barrel" type distortion may be characterized in the canonical perturbation theory by a finite $5^{th}$ Seidel coefficient F-numbers significantly smaller than those reported in the prior art have been accomplished with the present objectives, and fields of view in the region of 100 degrees may be attained.

After writing, such composite holograms are processed according to the particular requirements of the recording materials and a hologram is created. Preferred materials are Photopolymers and Silver Halides but other materials may also be used.

By suitable choice of the data processing algorithms many forms of holograms can be generated by the above process.

Two important classes of hologram may be distinguished. The first are holograms known as H1 holograms which are designed to be transferred to another hologram (henceforth referred to as the H2) in which the plane of the 3-D image is changed. Such image-plane transferring has been described above and is a standard classical optical technique. The second class of hologram is a hologram that mimics directly this transferred or H2 hologram avoiding the requirement to pass through the H1 stage. In this case the plane of the 3-D image is changed by using a computer to perform a different mathematical manipulation algorithm on the original data set.

As a person skilled in the art will appreciate these two different classes of hologram require significantly different writing conditions such that optimum hologram quality be attained for both classes. H1 holograms are best written with large pixels which may reach an area on the recording material of hundreds of times larger than the pixels required to write directly the final hologram. Each pixel is thus overlapped many times. This results in an H1 hologram that is reduced in brightness but which is fundamentally less noisy. The technique of image plane transferring is then able to compensate for this reduction in diffraction efficiency and the result is an H2 hologram that is optimally bright and of a very high quality.

Directly written holograms require an abutting pixel structure which is minimally overlapped if final hologram brightness is not to be compromised. This, of course, places constraints on the final image quality for certain applications.

5.3 Description of Preferred Embodiments

The following describe the preferred embodiments of the present invention which serves to describe and illustrate the principles of such invention. However it should be clear that those skilled in the art can make various modifications, additions and subtractions without departing from the scope of the invention. For example, an optical system may be arranged in a multitude of ways. The system for the advance and movement of the recording material relative to the spatial light modulator may be constructed also in numerous ways and rigid substrates instead of the flexible material used below may be employed.

5.3.1 The Object Beam Arm

Figure 2:
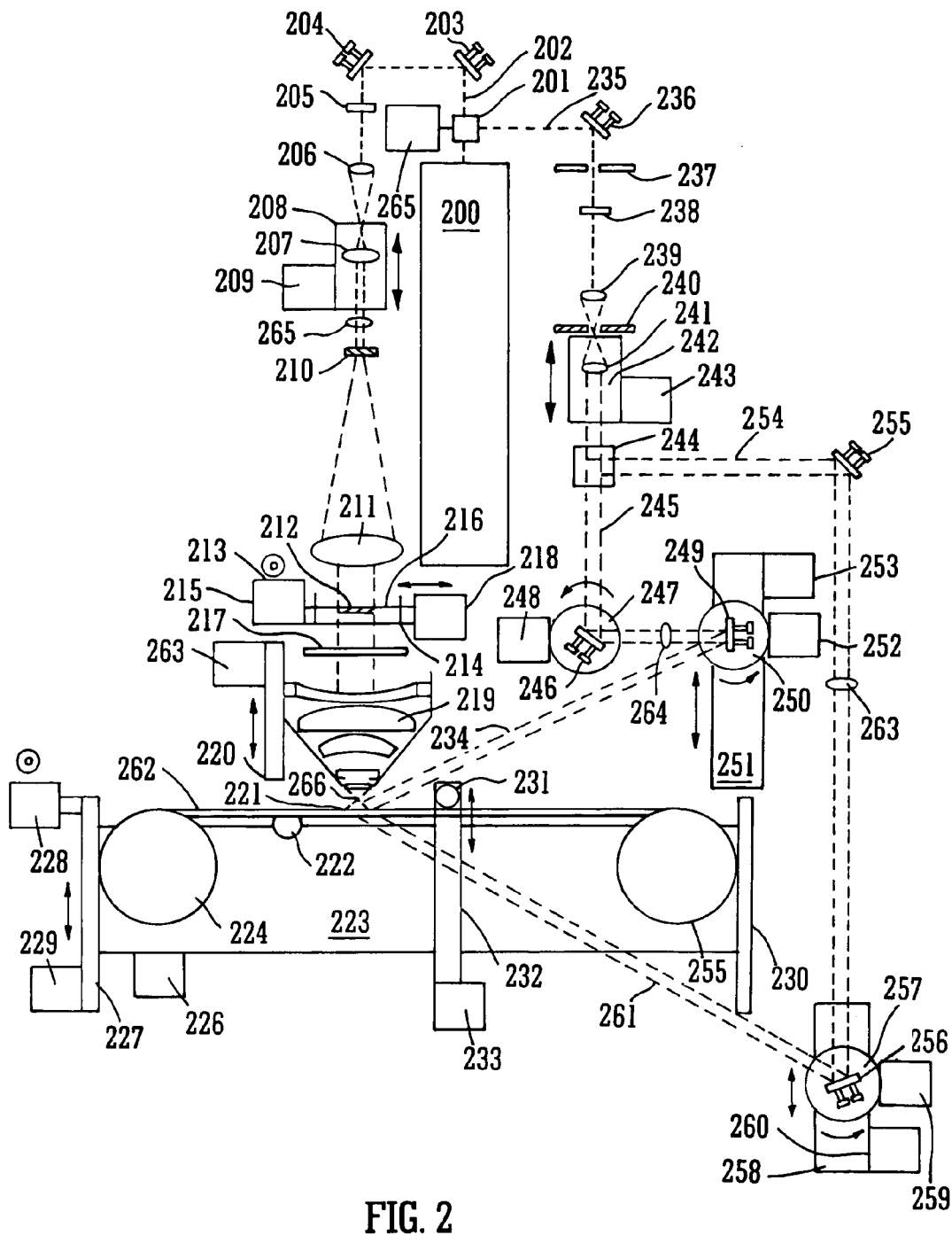
FIG. 2 illustrates a plan view of a preferred embodiment of invention.

FIG. 2 shows an overhead view of the preferred embodiment of the invention. A single colour single-frequency pulsed laser 200 (Nd:YLF single-oscillator flash-punped second harmonic (526.5 nm) single frequency laser giving 1 mJ per pulse in one embodiment) capable of rapid operation and having sufficient temporal coherence emits a beam of coherent light which is split by a variable beamsplitter 201. The beam 202 continues to the mirror 203 whereupon it is diverted to the mirror 204 whereupon it is diverted to the waveplate 205 which controls the polarization of the beam. The beam continues to a telescope comprising lenses 206, 207 and 265. Lens 207 is mounted on a motorized translation stage 208 with motor 209. The diameter of the beam exiting from optic 207 is thus controlled and approximately collimated. The beam passes to the micro-lens array 210 which expands the beam onto the collimating lens assembly 211. The distance between the elements 210 and 211 is chosen to be the effective focal length of the lens 211. In such a way a "collimated" beam exits the optic 211 with a controllable spatial coherence. The beam now illuminates a liquid crystal display (LCD) 212, having resolution 768×1024 pixels and lateral dimension of 26.4 mm, which is mounted on a 2-D motorized translation stage 216 having vertical control motor 215 and horizontal control motor 218. Positions of maximum LCD horizontal displacement are indicated by 213 and 214. The LCD position is adjusted when writing H1 type holograms and is used to attain a much higher resolution of final image than would otherwise be possible with the same static LCD for a given angle of view. The LCD position may also be adjusted when writing a 1-step hologram in order to maintain a particular hologram viewing window geometry.

Figure 5:
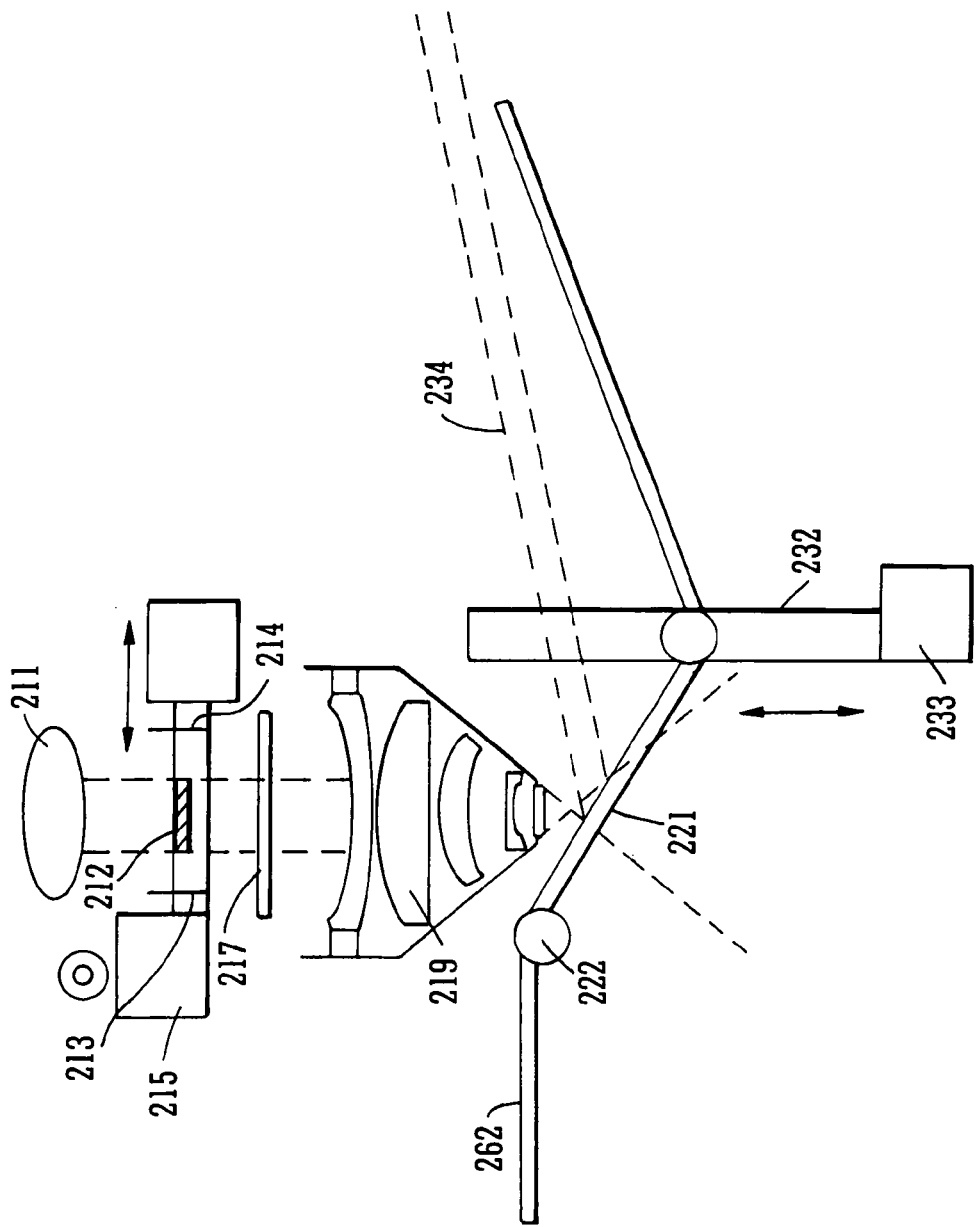
FIG. 5 illustrates an embodiment working in the H1 master writing mode for the case that the holographic recording material is orientated at the achromatic angle.

After passing through the liquid crystal display, the beam traverses a linear polarizer that converts the LCD image from a polarization rotation image into amplitude modulation. Then the beam passes through the wide-angle objective 219 mounted on the motorized translation stage 220 with motor 263. This stage is used to control the position of the focused image (1102 in FIG. 11) of the LCD produced by the objective 219. The size of the minimum waist 266 of the object beam is controlled by the motorized stage 208 with motor 209. The object beam now comes to bear on the hologram material 262 here shown as film mounted on a roll/stage system. The motor 229 controls movement of the stage 223 towards and away from the position of minimum object beam waist. The rollers 224 and 225 control the horizontal movement of the film 262 in front of the object beam. The motor 228 controls the vertical movement of the film in front of said object beam. Motor 226 controls the motion of the rollers 224 and 225. Rollers 222 and 231 tension the film and control the horizontal angle that the film makes to the axial propagation vector of the object beam. For example FIG. 5 shows a section of this diagram for the case that the film is pulled back to the achromatic angle which is useful when writing H1 masters for transfer to panchromatic rainbow H2 holograms.

5.3.2 The Reference Beam Arm

The reference beam is split from the main laser beam by the variable beamsplitter 201 controlled by motor 265. The beam 235 is directed to a mirror 236 whereupon it is reflected through an quasi-elliptical or rectangular aperture 237, an effective image of which is eventually created at the intersection of the reference beam with the holographic recording material, such quasi-elliptical or rectangular shape producing a defined circular or quasi-elliptical or rectangular reference footprint on the recording material as may be required by the type of hologram being written. The reference beam continues to the vaveplate 238 which controls the polarization of the laser beam. The elements 239 and 241 with either 264 or 263 form a telescope that controls the size of the beam after 264/263 which is adjustable by the motorized stage 242 with motor 243. The beamsplitter switch 244 either directs the reference beam on the path 254 or onto the path 245. Path 245 is used to create transmission holograms whereas path 254 is used to create reflection holograms.

In the case of path 245 the reference beam passes through the lens 264 that produces an approximate image of the aperture 237 at the recording material surface. This lens also corrects for the slight divergence of the light produced by the lens 241. The divergence of the light after 264, which is ideally collimated, is thus controlled to within diffraction limits. Practically this means that for small reference beam size the beam will not be exactly collimated but that such departure from collimation will lead to an image blurring significantly less than that induced by the source size of the final hologram illumination source. Mirrors 246 and 249 now direct the reference beam onto its target to intersect the object beam at the surface of the holographic recording material. Motorized rotation stages 247 and 250 with motors 248 and 252 respectively and the linear translation stage 251 with motor 253 assure that different reference angles may be achieved for different placements and orientations of the recording material. For many applications Brewster's angle is to be preferred but some applications specifically require the flexibility to change this angle.

In the case of path 254 the reference beam passes through the lens 263 that produces an approximate image of the aperture 237 at the recording material surface. This lens also corrects for the slight divergence of the light produced by the lens 241. The divergence of the light after 263, which is ideally collimated, is thus controlled to within diffraction limits as above. Mirrors 255 and 256 now direct the reference beam onto its target to intersect the object beam at the surface of the holographic recording material, this time from the opposite side to the object beam. The motorized rotation stage with motor 259 and the linear translation stage 258 with motor 260 assure that different reference angles may be achieved for different placements and orientations of the recording material. For many applications Brewster's angle is to be preferred but some applications specifically require the flexibility to change this angle.

Figure 3:
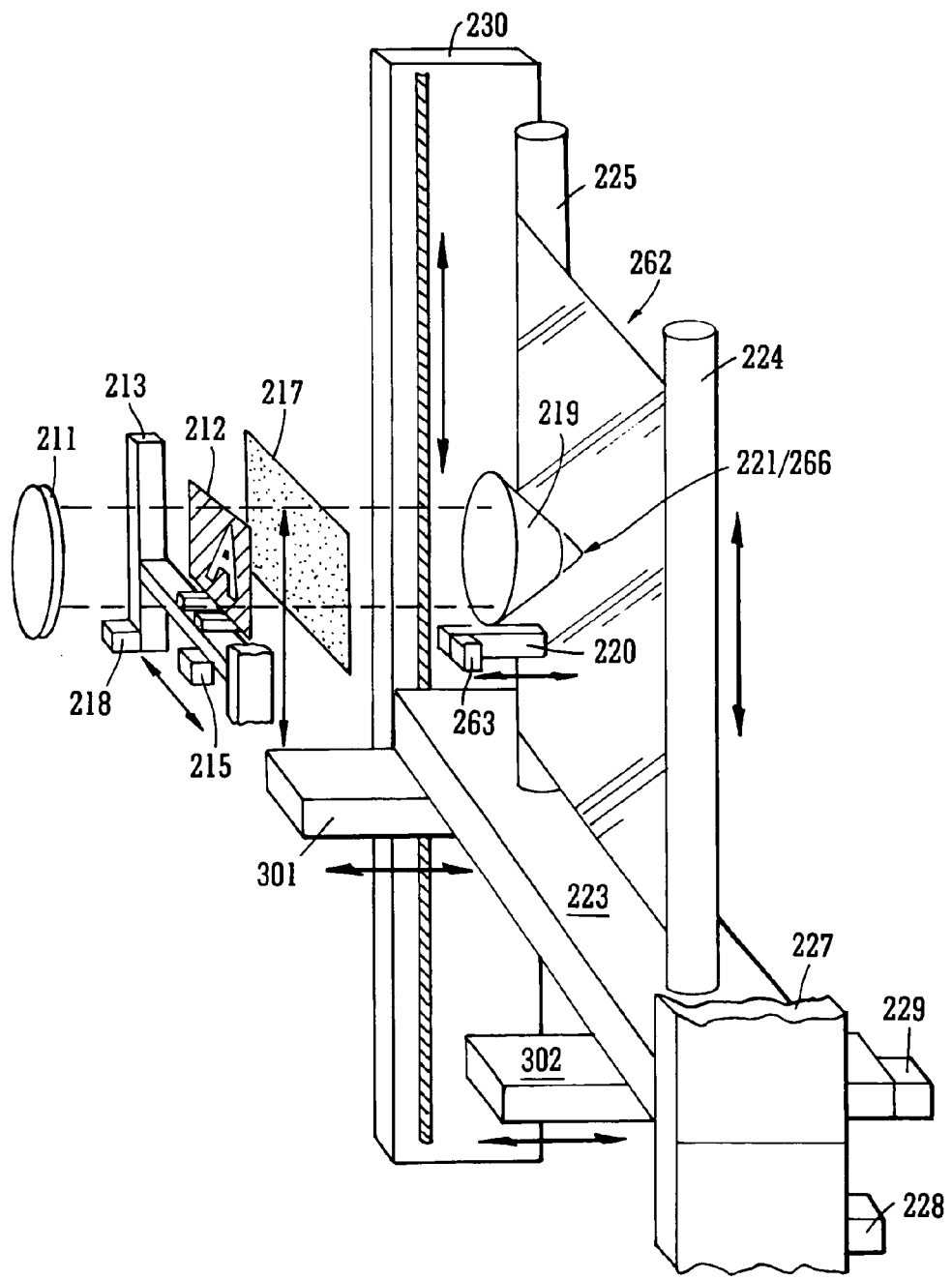
FIG. 3 illustrates selected key components of the preferred embodiment from a perspective view.

FIG. 3 shows a perspective view of selected components of the preferred embodiment numbered to correspond to FIG. 2.

5.3.3 H1 Transmission Holograms

By far the most frequently encountered type of H1 hologram is the H1 transmission hologram. This type of hologram comes in four basic varieties (i) H1s suitable for making rainbow transmission holograms; (ii) H1s suitable for making panchromatic (i.e. full colour) rainbow transmission holograms; (iii) H1s suitable for making achromatic (i.e. black and white) transmission holograms; and (iv) H1s suitable for making single colour reflection holograms. In all cases the individual holographic pixels should be well overlapped and much larger than the minimum waist size of the object beam in order to distribute the information of a particular perspective over a macroscopic area of the hologram and to insure good averaging of such spatial optical noise that is inherent in the system.

Figure 4:
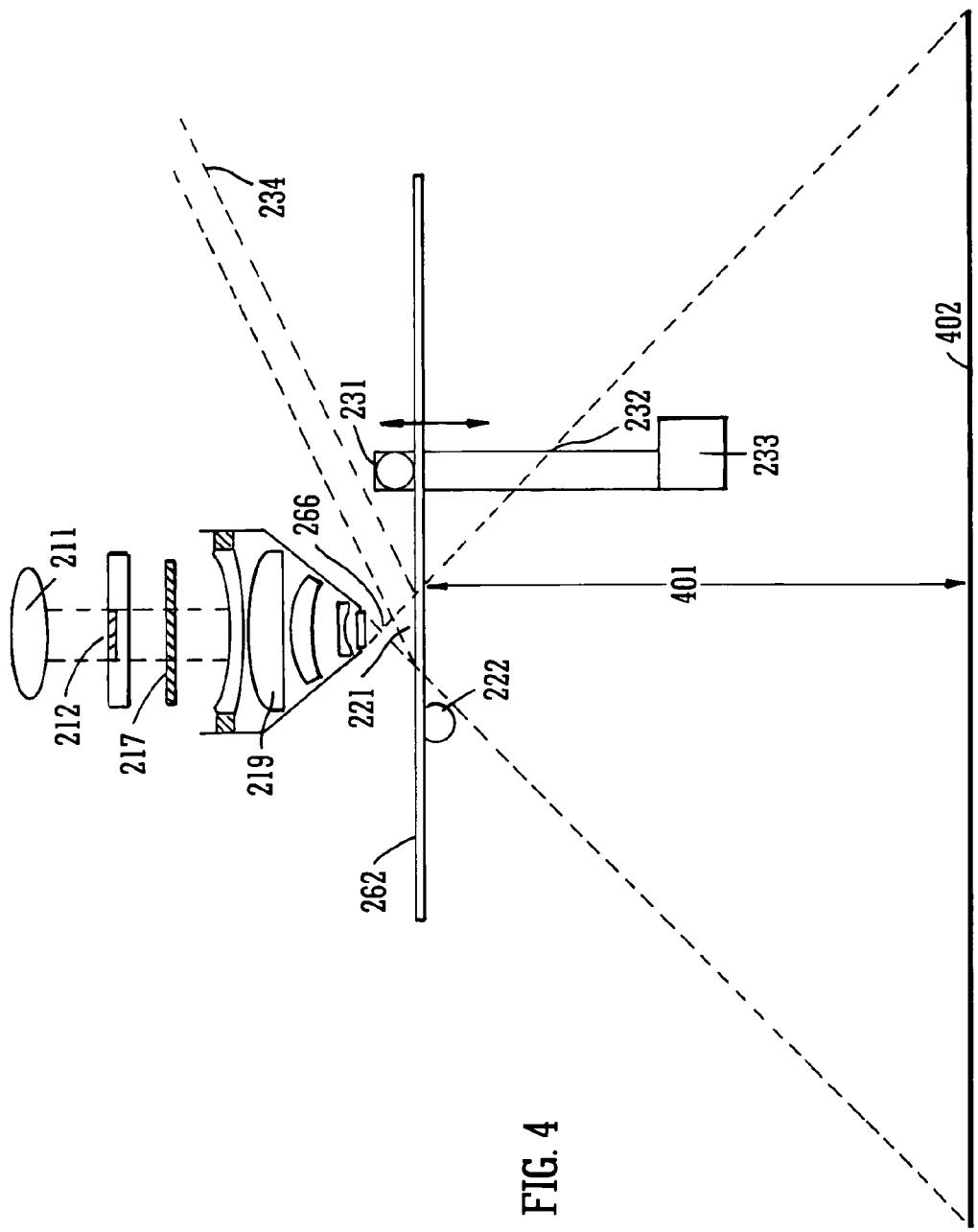
FIG. 4 illustrates an embodiment working in the H1 master writing mode for the case of a transmission H1 hologram.

FIG. 4 shows a diagram of the system in H1 transmission mode. Note that the reference beam comes in towards the recording material from the same side as the object beam to form a pixel 221. Note that said pixel is significantly displaced from the point of minimum waist 266. Note that the image (at the plane 1102 in FIG. 11) of the LCD 212 is located at a distance 401 from the recording material 262 and that a screen placed at 402 would show a sharply focused image of each 2-D picture loaded into the LCD 212. The plane 402 (1102 in FIG. 11) usually corresponds to the H2 plane in a transfer geometry.

Figure 8:
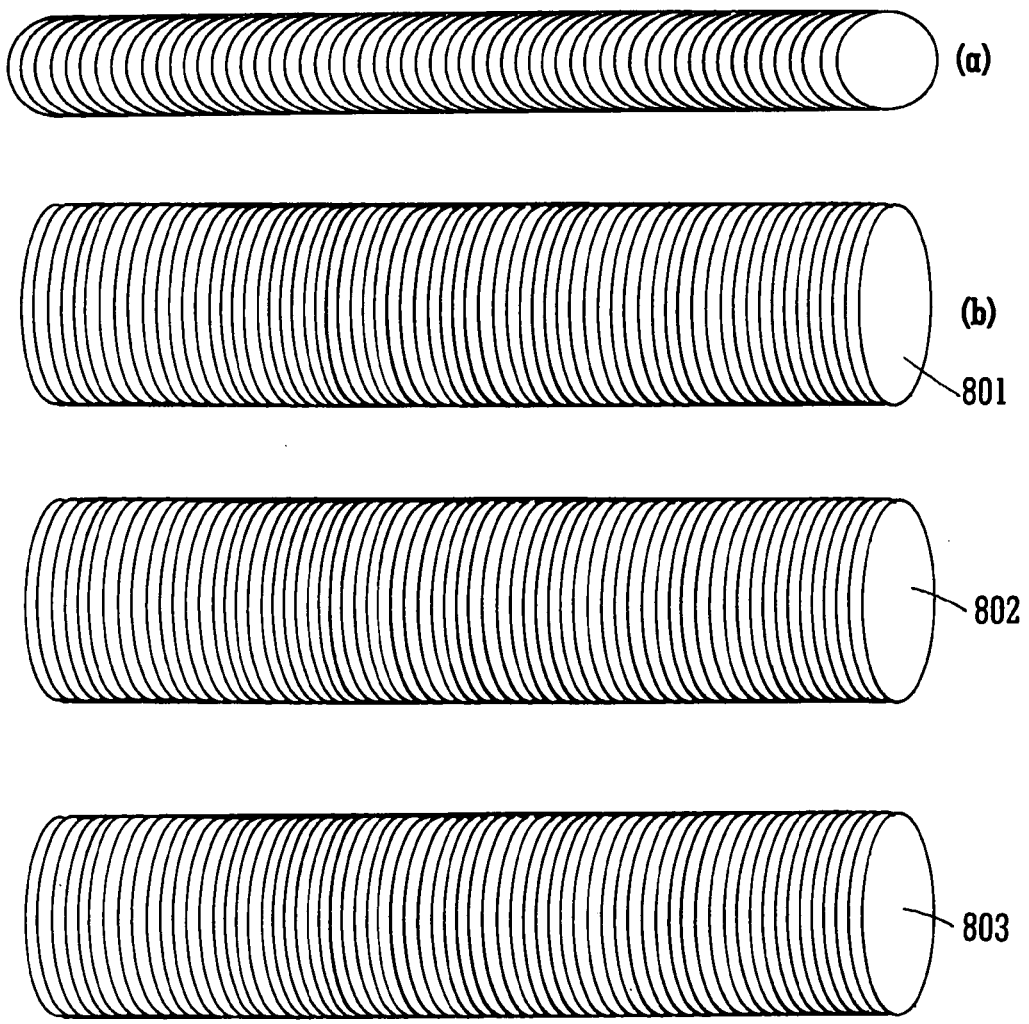
FIG. 8($a$) illustrates the overlapping object beam density pattern recorded on the holographic material typical of an H1 master hologram written for the creation of a rainbow hologram by conventional transfer with each circle containing the perspective information for a certain viewpoint.
Figure 9:
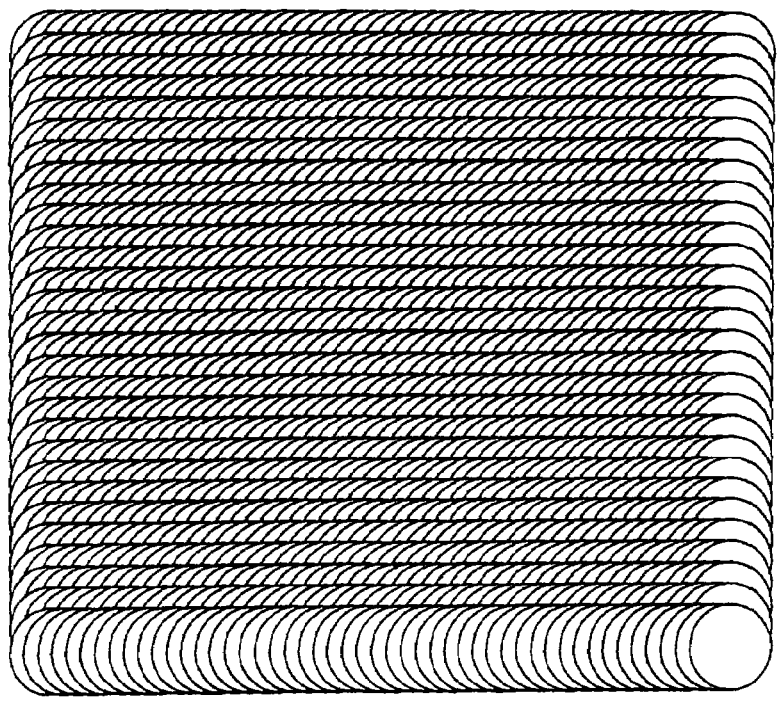
FIG. 9 illustrates the overlapping object beam density pattern recorded on the holographic material typical of an H1 full aperture master hologram written for the creation of a mono or full colour reflection hologram by conventional transfer with each circle containing the perspective information from a certain point in space as shown in FIG. 1.

In order to record an H1 transmission hologram perspective views of a real or computer generated object are pre-distorted to compensate for residual optical distortion and for a certain final lighting geometry. Such images are then loaded into the LCD one by one, a holographic pixel recorded, the recording material advanced and the process repeated for each image. For the case (i) above a line of pixels is written on the holographic recording material as illustrated in FIG. 8(*a*). Each circle represents an interference pattern containing information about a certain perspective view along a horizontal viewing line (note that in real life the individual pixel shape is not exactly circular but we have used this shape as a clear representation for the purposes of illustration). FIG. 8(*b*) illustrates the case (ii) where three lines of pixels are written at the achromatic angle each line corresponding to a red, green or blue component image in the axial viewing position of the final hologram. The recording geometry for case (ii) is shown in FIG. 5. FIG. 9 shows cases (iii) and (iv) where a 2-D array of pixels must be written. In the case of (iii) all the horizontal lines of pixels actually contain information relating to a single vertical parallax. In case (iv) this may or may not be the case. However, if full parallax is used the packing density of the pixels may be modulated to reduce chromatic blurring of the image. In fact the packing density may generally be modulated to optimize the reduction of optical noise by ensemble averaging whilst the clarity of an individual image is maintained from image blurring by a close partner pixel. Generally these considerations are more important for large reflection type full parallax holograms which suffer from chromatic blurring in the limit that infinitely many views are used to construct the stereogram. Nevertheless very large reduced parallax holograms should be optimized if blurring and noise are to be held in check.

In all cases the spatial coherence of the object beam must be controlled such that the size of the minimum waist in the object beam subsequent to the objective be controlled. This minimum waist determines, once again, the freedom from blurring of the image whilst improving the image quality. Hence too small a waist and the image quality will be bad and too large a waist and the image will be blurred. There is however a very large range of waist sizes in between extremes of these two parameters and it is highly desirable to accurately choose an optimum waist diameter. This is why it is a particularly preferred feature of the present invention to employ a method of controlling the spatial coherence of the object beam that easily permits said coherence to be changed.

Figure 6:
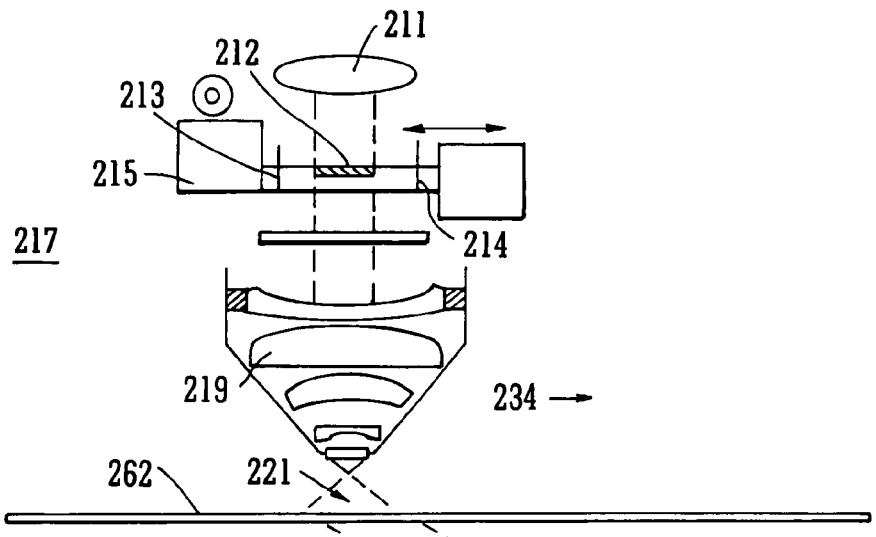
FIG. 6 illustrates an embodiment working in the H1 master writing mode for the case of a reflection H1 hologram.

The optimum maximum holopixel packing density of an H1 transmission hologram should be determined ultimately by the type of recording material used. In certain applications such as full-colour holography, a reflection H1 hologram is to be preferred over a transmission H1 hologram. In such a case the single frequency colour laser is replaced by a multi-colour single frequency laser and the LCD may, for example be replaced by a colour LCD or other spatial light modulator. In this case a colour H1 master hologram can be written with the geometry shown in FIG. 6 and that may be transferred by image planing to a colour reflection H2 hologram. The holopixel packing density of such H1 reflection holograms may well be slightly different to the pixel packing density preferred on H1 transmission holograms and this will depend on the characteristics of a given recording material.

5.3.4 Directly Written Holograms

Figure 7:
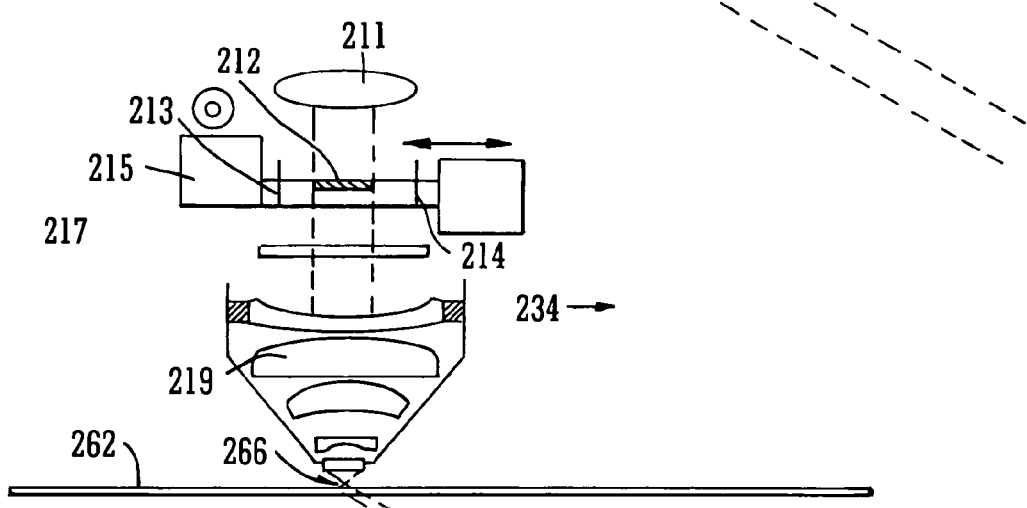
FIG. 7 illustrates an embodiment working in the direct (1-step) writing mode for the case of a reflection hologram.
Figure 10:
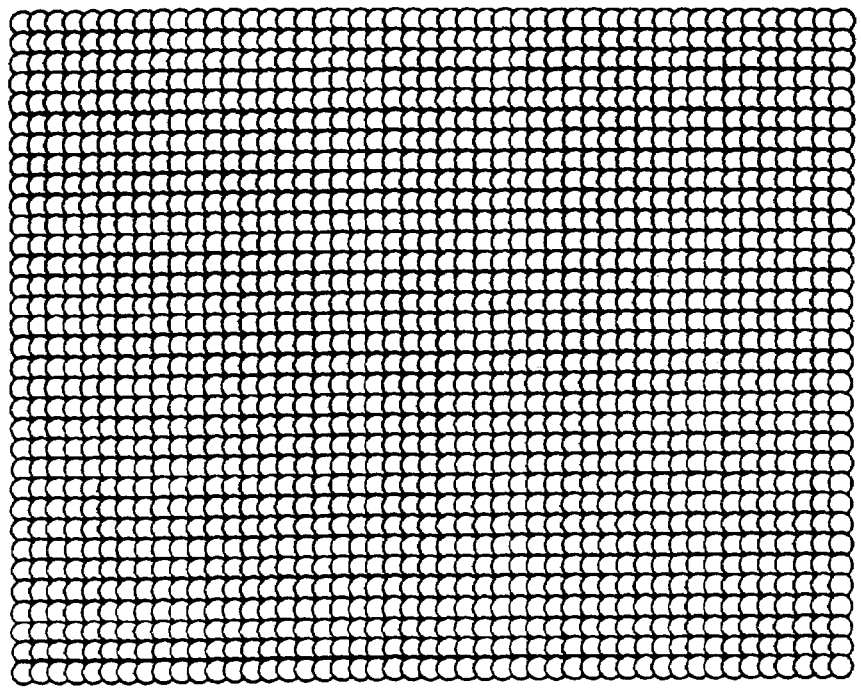
FIG. 10 illustrates the object beam density pattern recorded on the holographic material typical of a directly written hologram with each circle containing the directional and amplitude information of light originating from that point that constitutes the 3-D image.

When a hologram is directly written (1-step process) one can no longer control the final hologram brightness through an image planing transfer process. Hence the hologram that is being written should be of optimal brightness. This means that the holographic pixels must be abutted rather than overlapped as illustrated in FIG. 10. Consequently the optimum position for the holographic film is at the position of minimum object beam waist as illustrated in FIG. 7. The system of object beam spatial coherence control already described is now used to control the size of the holographic pixel and to assure that its intensity distribution on the recording material surface is approximately gaussian.

In order to record a directly written hologram, perspective views of a real or computer generated object are mathematically transformed to create a set of new images which are then pre-distorted to compensate for residual optical aberration and for a certain final lighting geometry. Such images are then loaded into the LCD, a holographic pixel recorded with the image plane of the LCD being set optimally to the intended viewing plane or to infinity and then the recording material advanced and the process repeated. The process is carried out in such a way as to create a two dimensional matrix of holographic pixels, with each such pixel reproducing faithfully the rays of light intersecting a corresponding point on a chosen image plane passing through the real or virtual computer object. Under certain approximations this technique thus produces a hologramidentical to a hologram that is produced as a H1 master hologram and then transferred using classical image planing to make an H2 hologram. However, in practice there are large differences and the two techniques are rather complimentary and, as discussed above, have preferred uses for different applications.

Different mathematical transforms may be constructed that create all the main types of holograms using the technique of directly writing the hologram. Rainbow holograms may be constructed by arranging that the individual LCD image files for a given holographic pixel consist of a single horizontal band of information. The height of this band on the LCD is chosen to depend on the vertical position of the holographic pixel. In this way a hologram is created that focuses its illumination light into a horizontal band in front of the hologram. This band is modulated with the image information from a single vertical perspective thus creating a rainbow hologram. In the case of a three colour rainbow holograms the image files for each holographic pixel consist of three horizontal bands whose vertical positions in the LCD depend differently on the vertical position of the respective holographic pixel. Consequently the final hologram acts to focus its illumination light into three horizontal bands parallel and in front of the hologram, this time the three bands lying on a plane orientated at the achromatic angle to the hologram's normal vector. Again each band is modulated with the respective primary colour image information from a single vertical perspective thus creating a panchromatic rainbow hologram. A monochromatic single parallax reflection hologram is created by LCD image files composed of vertical stripes horizontally modulated with the horizontal perspective information. Full parallax reflection holograms are likewise created by truly 2-D transformed LCD image files.

By playing with the mathematical transforms one is able to generate hybrid holograms by the direct writing technique such that the image appears achromatic from one perspective but perhaps has a rainbow character from another viewpoint Alternatively many different viewing windows can be constructed for the holograms with ease and parameters including the intrinsic image blurring may be controlled to produce very large depth views from certain angles whilst other angles may be optimized for image integrity of nearer objects.

5.3.5 Other Techniques

Figure 13C:
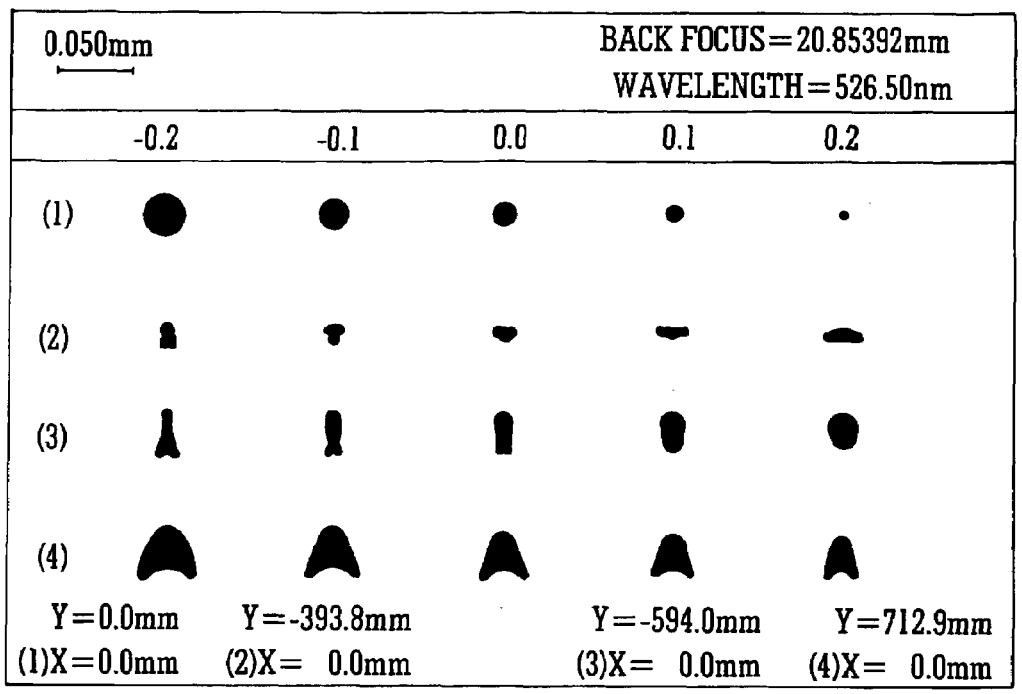
FIG. 13($a$)–($d$) show spot diagrams for the objective of FIGS. 11 and 12 calculated by reverse ray tracing from the object plane to the input data plane for four zoom configurations.
Figure 13D:
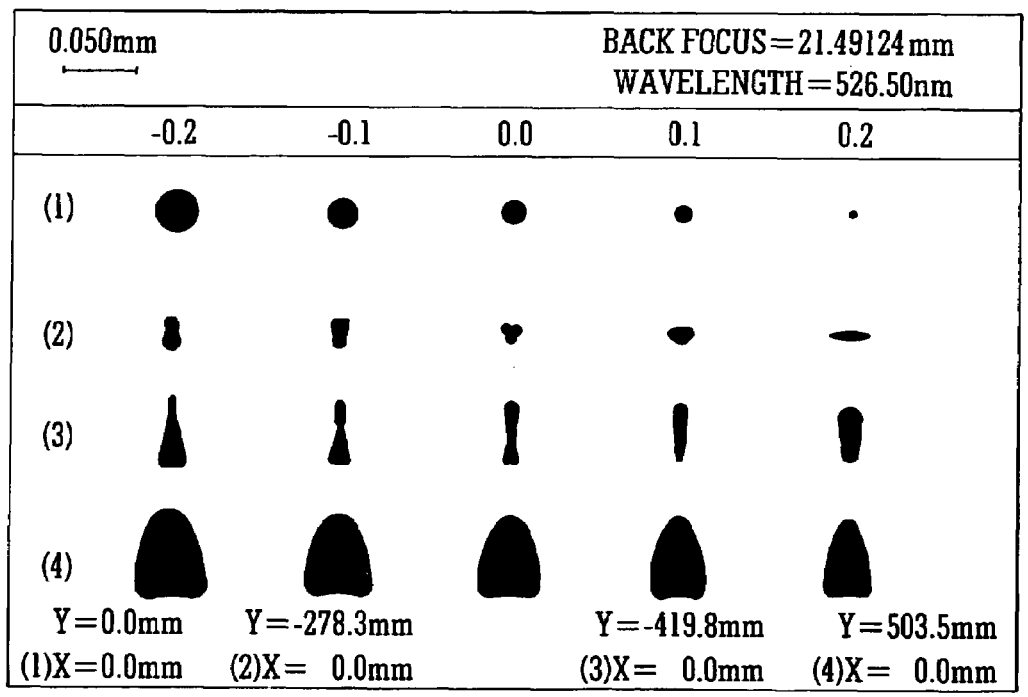
Figure 14B:
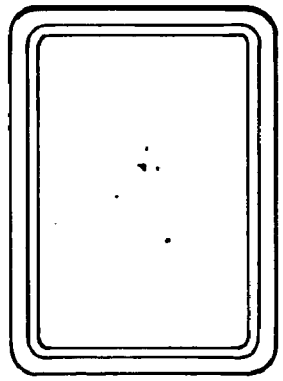
FIG. 14 shows ray intersection diagrams for the objective working at Zoom 3 of FIGS. 11,12 and 13 at the object and input data planes.
Figure 14D:
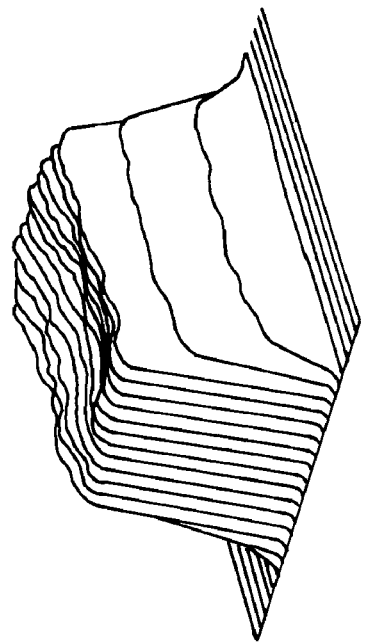
Figure 14A:
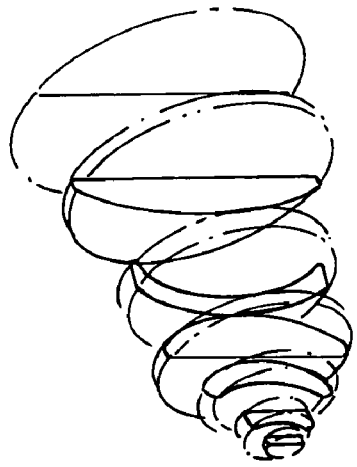
Figure 14C:
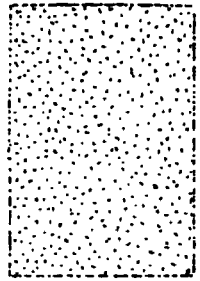
Figure 15:
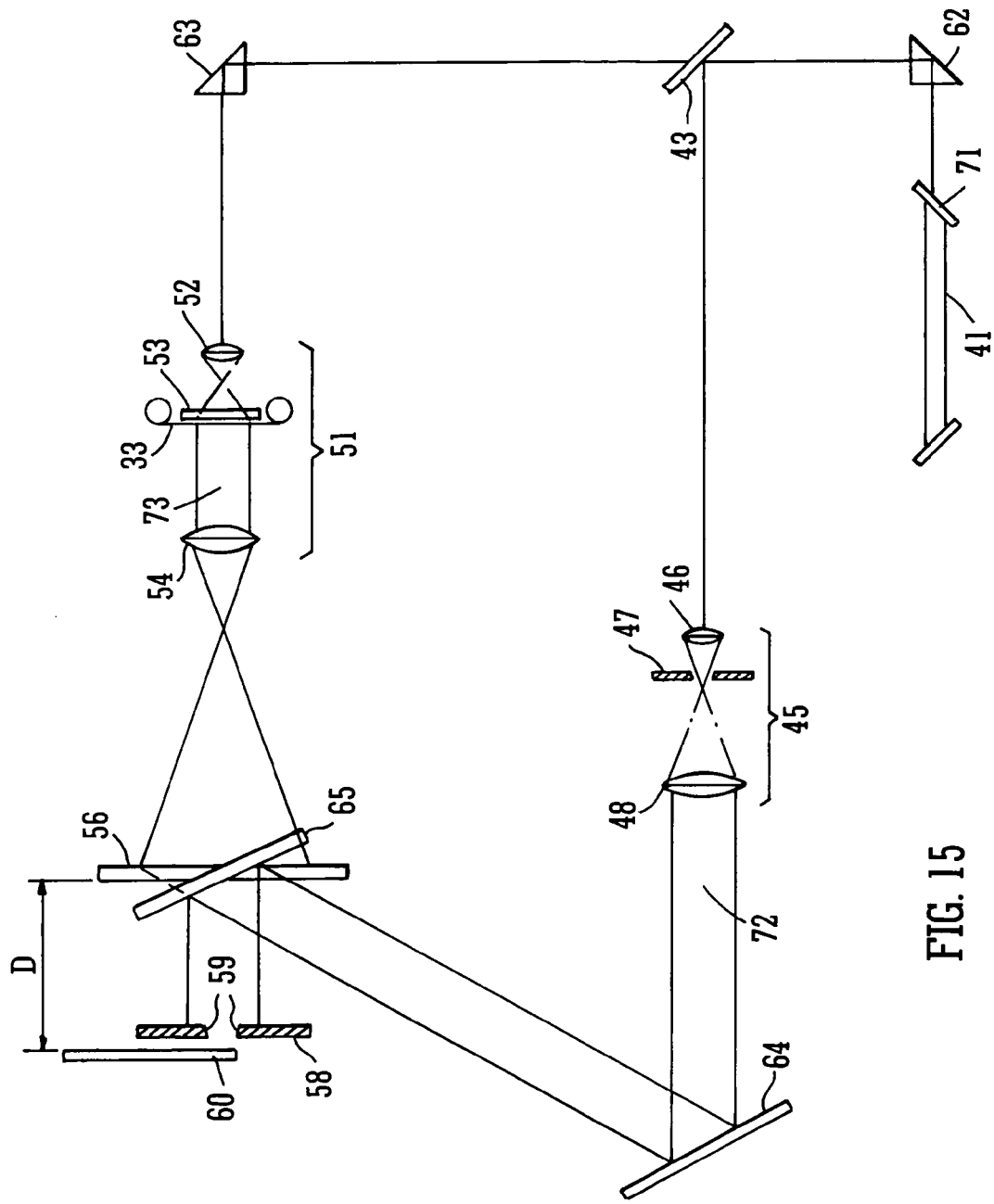
FIG. 15 illustrates a known holographic printer given for illustrative purposes only.
Figure 16:
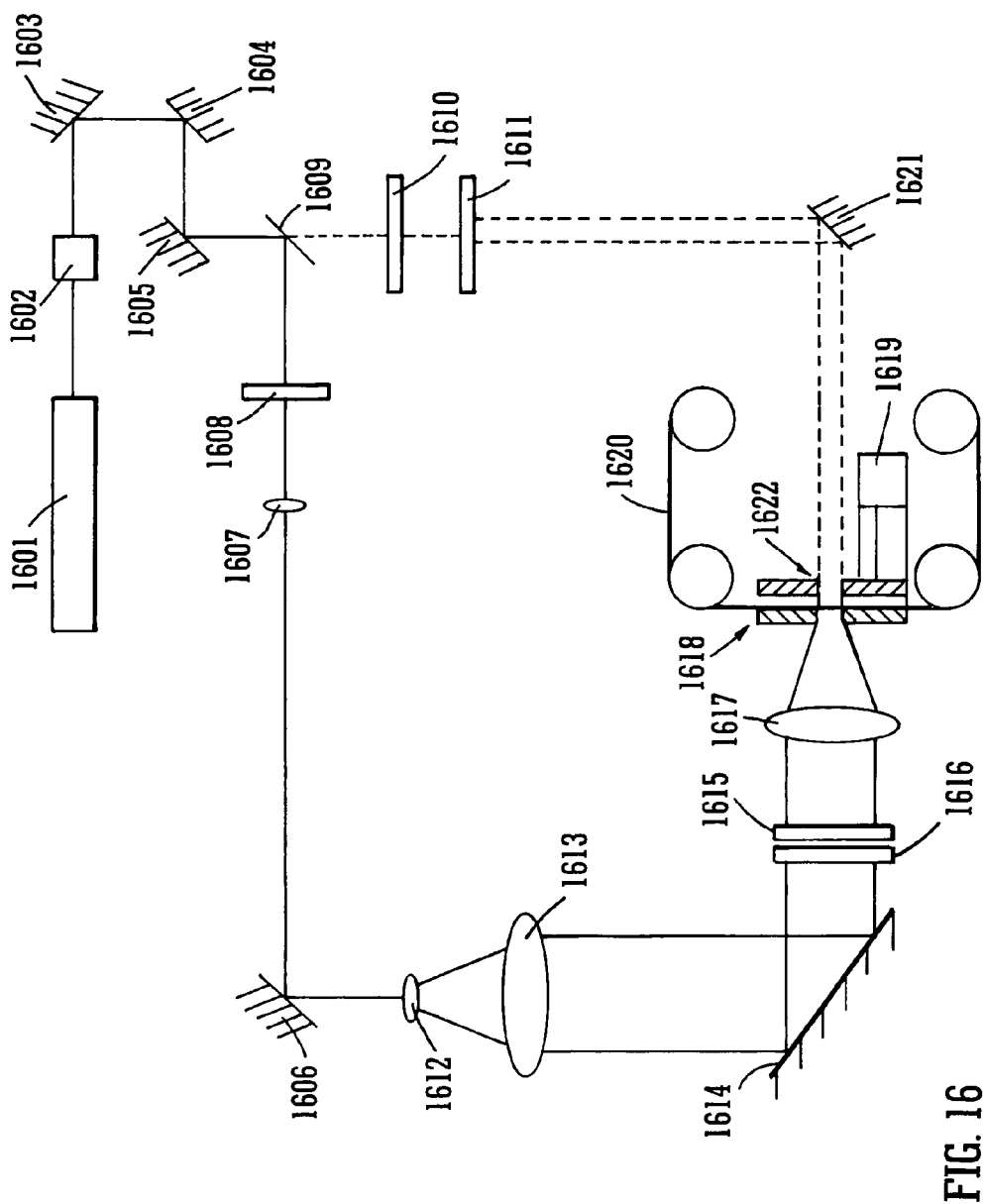
FIG. 16 illustrates an alternative known holographic printer.
Figure 17:
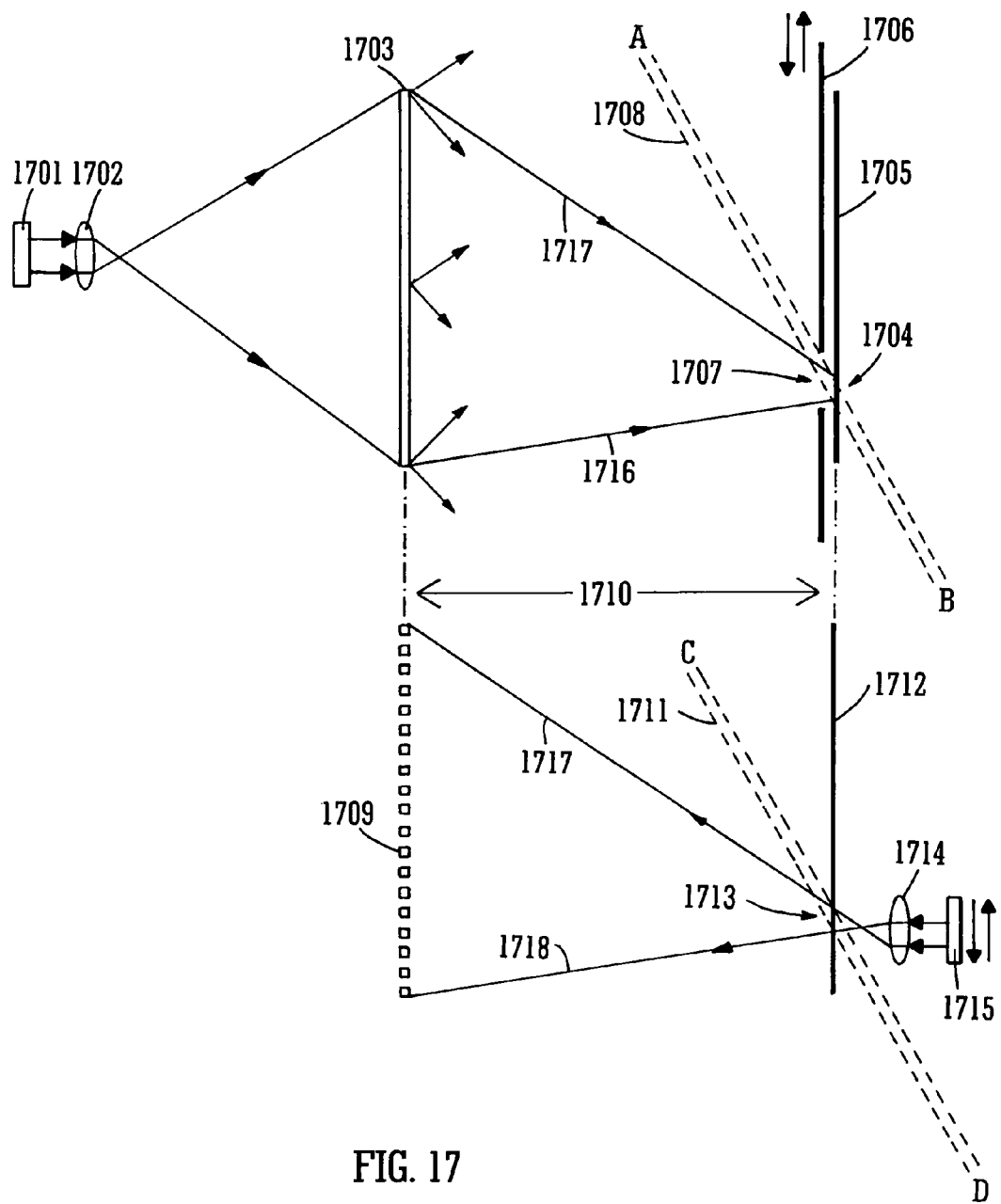
FIG. 17 compares a conventional method of producing a hologram with the corresponding method of a preferred embodiment.

The wide angle objective used in the embodiment described here above is illustrated and defined in FIGS. 11 to 14. This 85° objective has been designed for operation within a range of focal distances between 50 cm and 1.5 m. FIG. 13 shows standard spot diagrams for 4 zooms in between these extremes (zoom 1 corresponds to a magnification of 45×, zoom 2 to 31.8×, zoom 3 to 22.5 and zoom 4 to 15.9×). As can be seen the maximum projected spot size on the input data plane is not more than the pixel size of the LCD (approx 50 microns). The optical distortion of this particular objective is around 6%. By accepting a slightly higher value of 12% later versions have in fact improved resolution to well under the pixel size of the LCD.

The objective is designed to work with an LCD having lateral size 26.4 mm. However the input data plane of the objective (1101) is 61.7 cm wide, thus permitting significant lateral and up/down movement of the LCD within said plane. By insuring that our objective works within its design limits between a focal distance of 50 cm, where it gives a magnification of 15.9× to 1.5 m where it gives a magnification of 45× we are able to create maximum resolution 2-step holograms of sizes from 30×40 cm to larger than 1 m×1 m, all having appropriate optimum viewing distances. In connection to this latter point, one should note that the H1–H2 transfer distance is chosen to be equal to the objective focal distance used which is also then the optimum viewing distance of the final H2 hologram. (In the case of 1-step holograms there is no effective limit on hologram size supposing that one can arrange for a collimated replay illumination).

Frequently techniques for controlling the spatial coherence of the object beam lead to the introduction of noise into this beam. The most common is laser speckle and will be excluded from further consideration since the preferred embodiment controls the spatial coherence without introducing significant speckle. In the preferred embodiment of this invention a telescope and a micro-lens array has been used to achieve such control. However the physical construction of micro-lenses is prone to introduce some optical pattern into the object beam. This noise can be significantly reduced by moving the micro-lens array at each exposure in a random or ordered fashion. Such noise is also greatly reduced by choosing the optimum maximum pixel density as described above.

When writing H1 holograms the SLM can be moved both horizontally and vertically within the input data plane (1101) of the objective for sequential writing operations. This effectively allows the use of a smaller and lower-resolution SLM than we would otherwise have had to use if software image control were exclusively relied upon in order to achieve the same angle of view and resolution in the final H2 hologram. In the case of an H1 hologram for production of a rainbow hologram the SLM is only moved in one direction. However, for H1s for 3-colour rainbow holograms, H1s for reflection holograms or full parallax H1s the SLM must be moved in a 2-D sense.

The SLM may also be moved both horizontally and vertically within the input data plane (1101) of die objective when 1-step holograms are being written. In this case it is possible to modify advantageously the final viewing window of the hologram. Specifically we are able to make a hologram where said hologram is either completely viewable from a certain viewing zone or completely invisible. This should be contrasted with the case of a static SLM where optimum use of the SLM dictates that large portions of the hologram viewing zone show only a partial view of the hologram image.

In practice the hybrid technique of both using software control and some movement of the SLM in the objective input data plane (1101) can also be employed for both 1-step and H1 hologram generation.

Alternatively, where a very high resolution SLM is available, a larger static SLM effectively filling the input data plane (1101) of the objective will provide a better solution, all image manipulation now being done exclusively by software.

In the case of writing an H1 hologram the holographic film should be held at some significant distance from the location of the minimum beam waist (266). Since that part of the objective input data plane (i.e. containing the LCD) that is transmissive to laser light is always much smaller than the entire objective input data plane (1101) and further that this transmissive area must move from shot to shot due either to software image control or to the fact that the SLM is physically moved in the input data plane (at least one of which options is critically required for the invention to work correctly), it is to be noted that the zone of object radiation falling on the holographic film 262 at 221 also inevitably moves from exposure to exposure. The embodiment of FIG. 2 may therefore be further improved by arranging to move in a two dimensional automatic fashion the aperture 237 such that the reference beam shape, size and position on the holographic film plane effectively matches the object beam shape, size and position thereon. This improvement is not required when 1-step holograms are written as the position of the holographic film effectively coincides with the minimum waist point of the object beam. In this case the size, position and shape of reference and objects beams at the film plane are matched one time before for all exposures begin, rather than constantly tailoring the reference beam- and thus a moveable aperture is not usually required. Note that in FIG. 2 an aperture 237 was used to define reference beam shape and an adjustable telescope 239, 241, 263, 264 to define beam diameter. Further controllable mirrors (246 and 249 for example) then change the reference angle to the film plane 262. Generally these individual systems cross-link and software control must work out how to match the reference and object beam size, position and shape at the film plane in the best fashion. Clearly non-matched object and reference beams at the film plane will lead to image quality and brightness reduction.

In the embodiment of FIG. 2 the capability of changing the reference angle is to be noted. This is useful for a variety of reasons such as compensation for emulsion swelling on chemical processing, for the generation of H1 holograms designed for transfer at other laser wavelengths, for writing rainbow masters on a single (achromatically) tilted substrate and for creating holograms that are to be illuminated by a diverging or converging white light beam. One might note, however, that the aspect ratio of the aperture 237 must be changed as the reference angle is changed in order that object and reference footprints can properly match on the holographic film. In fact in order to attain complete matching of object and reference footprints one must arrange for a variably controllable variably magnified aperture. This complication is not evident in FIG. 2. In the case that a holographic printer must be able to print not only 1-step holograms having a pixel size of less than 1 mm but also H1 type holograms having pixel sizes of several cms, significant care must be exercised in the design of the reference beam preparation system. In this case elements 237, 239, 241, 263 and 264 may be individually complex elements, an automatic system for controlling the aperture size and aspect ratio may be present and software may link the system back to both the laser energy output and the object/reference ratio.

In many cases, 1-step holograms are illuminated for display with a non-collimated beam of white light emanating from a point source such as a halogen lamp. If account is not taken of the replay illumination geometry and further a constant angle of reference is employed at recording, both image distortion and viewing window distortion will occur on illumination of the 1-step hologram by a diverging beam. By using a combination of image pre-distortion based on a diffractive model, one or two-dimensional translation of the LCD and by moving the reference beam in only one dimension at each holopixel exposure, any induced image distortion can be compensated for and a very much improved hologram viewing window may be attained. Thus the combination of a one-dimensionally changeable reference beam, a translatable LCD and software image distortion are highly desirable, particularly for larger holograms. Usually the reference beam is required only to be changed over a relatively minor range of angles in order to compensate for a non-collimated replay beam and hence the above complication of an automatic system for controlling the reference beam control aperture size and aspect ratio is desirable only in certain cases such as, for example, when smaller 1-step holograms are tiled together to form larger panels. By the use of a static LCD it is possible to produce holograms that are designed for point source illumination but higher resolution SLM panels are then required. Since commercial SLM resolution is limited and it is desired to produce an optimum hologram quality it is hence desired to be able to translate said SLM. In principle a two-dimensional angular manipulation of the reference during recording is possible but in practice we find that the added mechanical complication of such a two-dimensional steering system is not merited and practically such system provides no substantial advantage.

During normal operation of the preferred embodiment several electromechanical precision stages may be required to update their position at exposure. When the laser (200) is operated at above a few Hz certain electromechanical problems need thus to be addressed as it becomes no longer possible to stop and start said electromechanical stages without the induction of unacceptable mechanical vibration with, for example, the associated loss of positioning precision.

This problem has been addressed by constructing a microprocessor-based controller which is capable of setting up different constant and non-linear programmed velocity trajectories on multiple stages. It is currently possible to run this system up to 30 Hz with excellent mechanical vibration characteristics.

In FIG. 5 a method for writing an H1 hologram suitable for transfer to a full colour rainbow hologram is shown. The film is shown pulled back by the roller 231 into the achromatic position. It should be noted, however, that this constitutes only one such way by which H1s suitable for this application may be written. In particular it may be decided to write the 3 or more strip master holograms (see FIG. 8*b*) with the film in the flat position as indicated in FIG. 2 rather than in the position indicated in FIG. 5. In this case the software and image focusing stage are adjusted to change key properties of the interference pattern written for each strip. A particular image plane transfer system is then used whereby the 3 strips are separated and aligned in a staggered geometry at the achromatic angle but individually all parallel to the final H2. Such a method has practical advantages concerning image quality, precision alignment and machine calibration over the simpler method covered above and that is illustrated in FIGS. 5 and 8*b*.

It should be noted that the pulsed laser 200 in the above embodiment has high temporal coherence and thus there is no prevision for adjusting the object and reference pathlengths therein. However, if a pulsed laser is employed which has a lesser temporal coherence then in accordance with a less preferred embodiment the object and reference paths are equalized and in the case that such coherence is marginal such equalization may be electromechanically controllable.

By arranging, for the case of a holographic printer employing a wide angle objective of very low aberration, that the vertical and horizontal movements of both the holographic material and the spatial light modulator are synchronized such that the image at the final H2 plane of the pixels of the spatial light modulator line up for all the 2-D images projected in the creation of an H1 hologram in such a manor that such H1 hologram, when transferred to an H2 hologram, will create a defined pixelated image on the surface of said H2 hologram, then the images on the spatial light modulator can be decomposed and encoded into interlaced groups of pixels representing several primary colours and a registered coloured mask may be attached, laminated or printed onto said H2 hologram to produce a multiple colour hologram.

5.4 Modifications to the Preferred Embodiment

As mentioned above, the preferred embodiment may employ a monochromatic pulsed laser or a multiple colour pulsed laser. The principle advantage of using a multiple colour laser is that multiple colour or full colour reflection holograms may be printed either using the 1-step or by using the 2-step method.

Figure 2A:
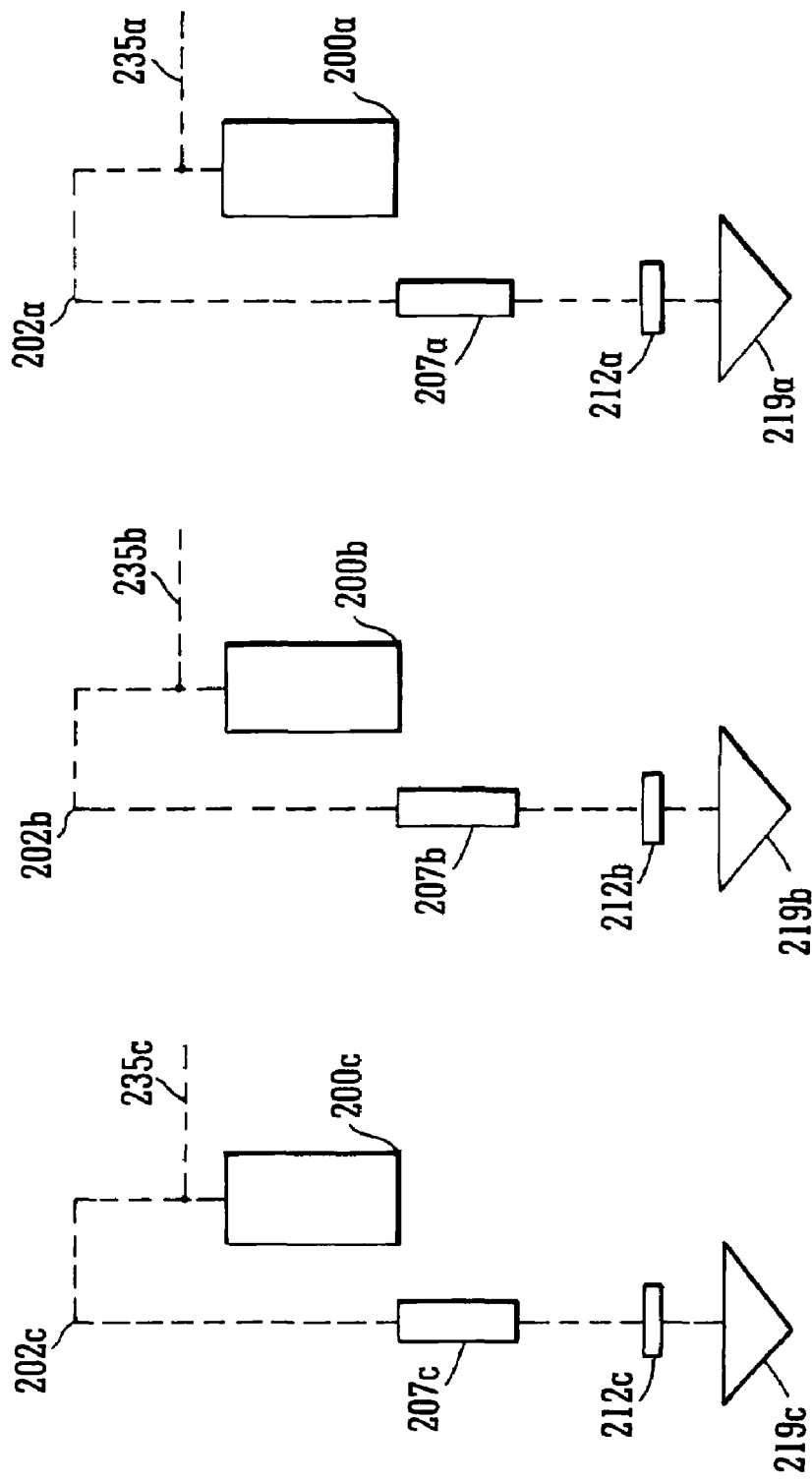
FIG. 2A is a block diagram showing one arrangement to provide multiple color holograms.

There are several choices on how to implement a multiple-colour pulsed laser in the preferred embodiment. Referring to FIG. 2A, the first is to simply construct several separate and distinct optical systems of the kind described above and shown in FIG. 2 one for each colour produced by the laser. This way, if it is assumed that said multiple colour laser has three emission wavelengths, essentially three of everything is required including three sources 200*a*, 200*b*, 200*c*, three controllable lens telescopes 207*a*, 207*b*, 207*c*, three lens systems 219*a*, 219*b*, 219*c*, three SLMs 212*a*, 212*b*, 212*c*, and three objectives 202*a*, 202*b*, 202*c* and three reference 235*a*, 235*b*, 235*c* beams. It is therefore possible to write holographic pixels three times as fast, but of course there are also three times as many pixels to write. If this method of implementation of a multiple colour laser is chosen the film (or plate) advance system is organized such that it supports three separate concurrent write locations. In addition the spacing between the different colour holographic pixels is controlled such that in one case it is arranged that pixels of differing colour line up and in another case a well-defined chromatic pixel juxtaposition is created.

The other way this problem has been tackled is by creating an optical system with a changeable writing objective that otherwise functions equally well for each of the component wavelengths. It is effectively impractical to create an optical system in its entirety that functions for many wavelengths at the same time. This is primarily due to the very specialized objective that we must use which depends on its design for use at only one wavelength. Hence this problem is solved by exposing first with one colour, then with another and so-forth. Each time the colour is changed the the appropriate writing objective is electromechanically selected. With three colours three objectives in a precision mount are used, each of which can be loaded at call.

In summary the present invention provides a method and apparatus for writing all the major types of 1-step and intermediate H1 type holograms of high quality, at speeds fundamentally faster than the prior-art and without practical constraints of operation on vibration.

The invention claimed is:

1. A holographic printer for directly writing 1-step white-light viewable holograms, comprising:
    a pulsed laser source arranged to produce a laser beam at a first wavelength, said laser beam being split into an object beam and a reference beam which is mutually coherent with said object beam;
    a spatial light modulator wherein, in use, said object beam illuminates said spatial light modulator;
    a lens system for writing a holographic pixel of a hologram on to a photosensitive medium, said lens system being arranged downstream of said spatial light modulator; and
    positioning means for positioning a photosensitive medium at the Fourier plane of said lens system;
    wherein said laser source is arranged to additionally produce laser beams at second and third wavelengths, and wherein said first, second and third wavelengths each differ from one another by at least 30 nm.

2. A holographic printer as claimed in claim 1, further comprising a second lens system for use at said second wavelength.

3. A holographic printer as claimed in claim 2, further comprising a third lens system for use at said third wavelength.

4. A holographic printer as claimed in claim 1, wherein said spatial light modulator is translatable.

5. A holographic printer as claimed in claim 1, wherein the Fourier plane of said lens system is located downstream of said lens system.

6. A holographic printer as claimed in claim 5, wherein the Fourier plane of said lens system is located at least 2 mm downstream of said lens system.

7. A holographic printer for directly writing 1-step white-light viewable holograms, comprising:
    a pulsed laser source arranged to produce a laser beam at a first wavelength, said laser beam being split into an object beam and a reference beam which is mutually coherent with said object beam;
    a spatial light modulator wherein, in use, said object beam illuminates said spatial light modulator;
    a lens system for writing a holographic pixel of a hologram on to a photosensitive medium, said lens system being arranged downstream of said spatial light modulator; and
    positioning means for positioning a photosensitive medium at the Fourier plane of said lens system;
    wherein said holographic printer further comprises a second and a third laser source for producing laser beams at second and third wavelengths, and wherein said first, second and third wavelengths each differ from one another by at least 30 nm.

8. A holographic printer as claimed in claim 7, further comprising a second lens system for use at said second wavelength.

9. A holographic printer as claimed in claim 8, further comprising a third lens system for use at said third wavelength.

10. A holographic printer as claimed in claim 7, wherein said spatial light modulator is translatable.

11. A holographic printer as claimed in claim 7, wherein the Fourier plane of said lens system is located downstream of said lens system.

12. A holographic printer as claimed in claim 11, wherein the Fourier plane of said lens system is located at least 2 mm downstream of said lens system.

13. A method of directly writing 1-step white-light viewable holograms, comprising:
    providing a pulsed laser source arranged to produce a laser beam at a first wavelength;
    splitting said laser beam into an object beam and a reference beam which is mutually coherent with said object beam;
    illuminating a spatial light modulator with said object beam;
    providing a lens system for writing a holographic pixel of a hologram on to a photosensitive medium, said lens system being arranged downstream of said spatial light modulator; and
    positioning a photosensitive medium at the Fourier plane of said lens system;
    wherein said laser source is arranged to additionally produce laser beams at second and third wavelengths, and wherein said first, second and third wavelengths each differ from one another by at least 30 nm.

14. A method of directly writing 1-step white-light viewable holograms, comprising:
    providing a pulsed laser source arranged to produce a laser beam at a first wavelength;
    splitting said laser beam into an object beam and a reference beam which is mutually coherent with said object beam;
    illuminating a spatial light modulator with said object beam;
    providing a lens system for writing a holographic pixel of a hologram on to a photosensitive medium, said lens system being arranged downstream of said spatial light modulator; and
    positioning a photosensitive medium at the Fourier plane of said lens system;
    wherein said holographic printer further comprises a second and a third laser source for producing laser beams at second and third wavelengths, and wherein said first, second and third wavelengths each differ from one another by at least 30 nm.

* * * * *